(12) United States Patent
Lukac et al.

(10) Patent No.: US 12,340,441 B2
(45) Date of Patent: Jun. 24, 2025

(54) RECONSTRUCTING CONCENTRIC RADIAL GRADIENTS

(71) Applicant: ADOBE INC., San Jose, CA (US)

(72) Inventors: Michal Lukac, Boulder Creek, CA (US); Souymodip Chakraborty, Bangalore (IN); Matthew David Fisher, Burlingame, CA (US); Vineet Batra, Delhi (IN); Ankit Phogat, Haryana (IN)

(73) Assignee: ADOBE INC., San Jose, CA (US)

( * ) Notice: Subject to any disclaimer, the term of this patent is extended or adjusted under 35 U.S.C. 154(b) by 309 days.

(21) Appl. No.: 17/823,574

(22) Filed: Aug. 31, 2022

(65) Prior Publication Data

US 2024/0078719 A1  Mar. 7, 2024

(51) Int. Cl.
*G06T 11/00* (2006.01)
*G06T 7/90* (2017.01)
*G06T 9/20* (2006.01)

(52) U.S. Cl.
CPC .............. *G06T 11/001* (2013.01); *G06T 7/90* (2017.01); *G06T 9/20* (2013.01)

(58) Field of Classification Search
CPC ... G06T 9/20; G06T 5/80; G06T 2207/10024; G06T 7/90; G06T 11/001; G06V 10/469; G06V 10/761; G06V 10/56
See application file for complete search history.

(56) References Cited

U.S. PATENT DOCUMENTS

| | | | | |
|---|---|---|---|---|
| 6,343,146 B1* | 1/2002 | Tsuruoka | ............... | G06T 3/4015 382/163 |
| 6,784,896 B1* | 8/2004 | Perani | ................... | G06T 11/203 345/589 |
| 6,879,327 B1* | 4/2005 | Mathur | ................... | G06T 11/40 345/589 |
| 2009/0244630 A1* | 10/2009 | Miyazaki | .............. | G06T 11/001 358/1.13 |

(Continued)

FOREIGN PATENT DOCUMENTS

WO  WO-2020079355 A1 *  4/2020  ............. G01B 17/00

OTHER PUBLICATIONS

E. Nezhadarya and R. K. Ward, "A New Scheme for Robust Gradient Vector Estimation in Color Images," in IEEE Transactions on Image Processing, vol. 20, No. 8, pp. 2211-2220, Aug. 2011, doi: 10.1109/TIP.2011.2118217. (Year: 2011).*

(Continued)

*Primary Examiner* — Kee M Tung
*Assistant Examiner* — Nauman U Ahmad
(74) *Attorney, Agent, or Firm* — F. CHAU & ASSOCIATES, LLC

(57) ABSTRACT

Systems and methods for image processing are described. Embodiments of the present disclosure receive a raster image depicting a radial color gradient; compute an origin point of the radial color gradient based on an orthogonality measure between a color gradient vector at a point in the raster image and a relative position vector between the point and the origin point; construct a vector graphics representation of the radial color gradient based on the origin point; and generate a vector graphics image depicting the radial color gradient based on the vector graphics representation.

19 Claims, 16 Drawing Sheets

(56) References Cited

U.S. PATENT DOCUMENTS

| | | | |
|---|---|---|---|
| 2012/0288188 A1* | 11/2012 | Oto | G06T 9/20 |
| | | | 382/164 |
| 2016/0062731 A1* | 3/2016 | Lin | G06F 16/319 |
| | | | 707/742 |
| 2019/0102914 A1* | 4/2019 | Stefanov | G06T 11/00 |
| 2021/0150776 A1* | 5/2021 | Biswas | G06T 7/90 |

OTHER PUBLICATIONS

Dhariyal, et al., "An Examination of the State-of-the-Art for Multivariate Time Series Classification", In 2020 International Conference on Data Mining Workshops (ICDMW) (pp. 243-250), (Nov. 2020), IEEE.

Favreau, et al., "Photo2ClipArt: Image Abstraction and Vectorization Using Layered Linear Gradients", ACM Transactions on Graphics, vol. 36, No. 6, Article 180. Publication date: Nov. 2017, pp. 180:1-180:11.

Kansal, et al., "A vectorization framework for constant and linear gradient filled regions", The Visual Computer, 31(5), (2015), pp. 717-732.

Lecot, et al., "ARDECO: Automatic Region DEtection and Conversion", In 17th Eurographics Symposium on Rendering—EGSR'06, (Jun. 2006), pp. 349-360.

Orzan, et al., "Diffusion Curves: A Vector Representation for Smooth-Shaded Images", ACM Transactions on Graphics (TOG), 27(3), (2008), pp. 1-8.

Sun, et al., "Image Vectorization using Optimized Gradient Meshes", ACM Transactions on Graphics (TOG), 26(3), (2007), 11-es, 7 pages.

Related to U.S. Appl. No. 17/901,583, filed Sep. 1, 2022.

Office Action dated Oct. 2, 2024 in related U.S. Appl. No. 18/051,648.

\* cited by examiner

RECONSTRUCTING CONCENTRIC RADIAL GRADIENTS

BACKGROUND

The following relates generally to digital image processing. Digital image processing refers to the use of a computer to edit a digital image using an algorithm or a processing network. Image processing software is commonly used for image editing, image reconstruction, vectorization, etc. Raster images are compiled using pixels or dots and they are resolution dependent. The quality of raster images depends on the number of pixels displayed in a certain area of the images. Vector images, on the other hand, are made up of paths or line objects that are infinitely scalable as they are not dependent on pixels. In some examples, a raster image may be converted to a vector graphics image using an image vectorization application.

Recently, image vectorization techniques have been used to convert a raster image to a vector graphics image. However, these systems are limited to trace or vectorize using solid fill paths. The output image loses information and fidelity compared to the original image and is also difficult for content creators to work with. Therefore, there is a need in the art for an improved image processing system that can efficiently perform image reconstruction while preserving image details.

SUMMARY

The present disclosure describes systems and methods for image processing. Embodiments of the disclosure include an image processing apparatus configured to receive a raster image depicting a radial color gradient, constructing a vector graphics representation (i.e., an origin point, one or more color stops), and generate a vector graphics image depicting the radial color gradient. The image processing apparatus extracts concentric radial gradients to approximate a smoothly shaded region of a raster image. The image processing apparatus is configured to estimate an origin point of the raster image and two or more color stops (and respective positions) of the radial gradient with respect to the origin point. This way, users can easily convert a raster image to a vector graphics image (i.e., image vectorization) depicting a radial color gradient without loss of information. In addition, users avoid artifacts derived from methods such as using solid filled paths.

A method, apparatus, and non-transitory computer readable medium for image processing are described. One or more embodiments of the method, apparatus, and non-transitory computer readable medium include receiving a raster image depicting a radial color gradient; computing an origin point of the radial color gradient based on an orthogonality measure between a color gradient vector at a point in the raster image and a relative position vector between the point and the origin point; constructing a vector graphics representation of the radial color gradient based on the origin point; and generating a vector graphics image depicting the radial color gradient based on the vector graphics representation.

A method, apparatus, and non-transitory computer readable medium for image processing are described. One or more embodiments of the method, apparatus, and non-transitory computer readable medium include receiving a raster image depicting a radial color gradient; computing an origin point of the radial color gradient; computing a color stop based on a function of color intensity with respect to a radial distance from the origin point; constructing a vector graphics representation of the radial color gradient based on the origin point and the color stop; and generating a vector graphics image depicting the radial color gradient based on the vector graphics representation.

An apparatus and method for image processing are described. One or more embodiments of the apparatus and method include at least one processor; at least one memory including instructions executable by the at least one processor to perform the functions of: an origin estimation component configured to compute an origin point of a radial color gradient; a color stop identification component configured to compute a color stop based on a function of color intensity with respect to a radial distance from the origin point; a vector graphics representation component configured to construct a vector graphics representation of the radial color gradient based on the origin point and the color stop; and an image generation component configured to generate a vector graphics image depicting the radial color gradient based on the vector graphics representation.

DETAILED DESCRIPTION

Figure 1:
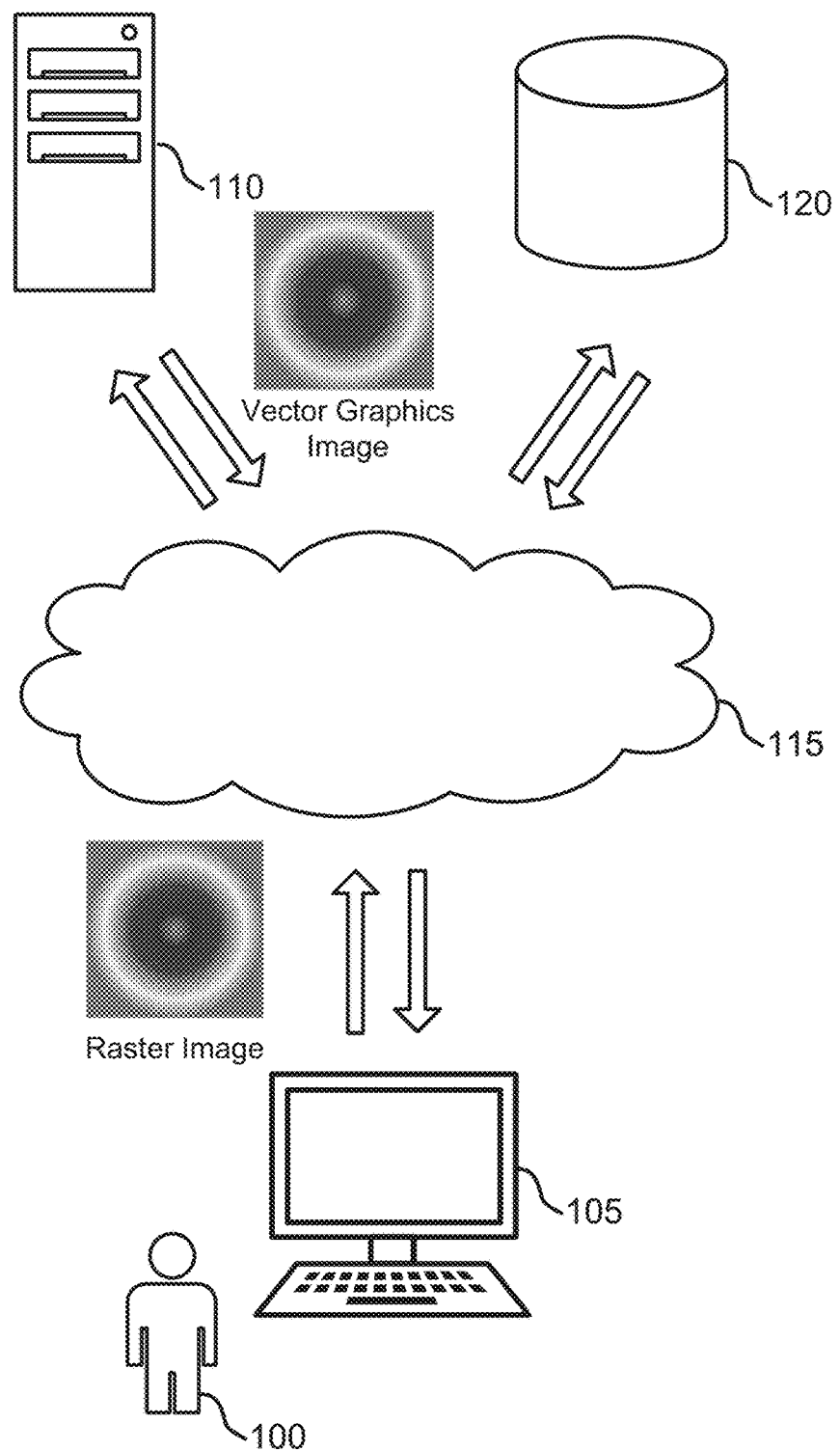
FIG. 1 shows an example of an image processing system according to aspects of the present disclosure.

The present disclosure describes systems and methods for image processing. Embodiments of the disclosure include an image processing apparatus configured to receive a raster image depicting a radial color gradient, constructing a vector graphics representation (i.e., an origin point, one or more color stops), and generate a vector graphics image depicting the radial color gradient. The image processing apparatus extracts concentric radial gradients to approximate a smoothly shaded region of a raster image. The image processing apparatus is configured to estimate an origin point of the raster image and color stops (and respective positions) of the radial gradient with respect to the origin point. This way, users can easily convert an image to a vector graphics image (i.e., vectorization) depicting a radial color gradient without loss of information. In addition, users avoid artifacts such as solid filled paths.

Recently, image vectorization techniques have been used for converting a raster image to a vector graphics image. Conventional image editing systems often generate solid filled paths when reconstructing vector graphics from a raster image. The color transition between two paths of the solid filled paths is obvious to the eye (e.g., lacks smooth color transition among regions of different colors) and the output image loses information and fidelity compared to the original image. In some examples, conventional systems depend on gradient meshes or diffusion curves for the reconstruction of certain regions. Additionally, content creators have a difficult time editing the output image due to the use of excessive geometry or intermediary line objects.

Embodiments of the present disclosure include an image processing apparatus configured to receive a raster image and extract concentric radial gradients based on a raster image to approximate a vector graphics image including smoothly shaded regions. The image processing apparatus is configured to generate a vector graphics representation including an origin point and a color stop point. With regards to concentric radial gradients, colors emerge from a center point (i.e., origin) and smoothly spread outward in a circular shape. In some cases, a concentric radial gradient is defined by the origin point, an ending shape (circle), and a color stop.

In some embodiments, the image processing apparatus receives a raster image depicting a radial color gradient. The image processing apparatus identifies the direction of change of color intensity in a superpixel (e.g., a 2D region in space including a closed compact set of points). The image processing apparatus computes an origin point of the radial color gradient that indicates a direction in which the color intensity change is aligned. That is, the color of a superpixel may be defined by a radial color gradient, and accordingly the directions in which the color intensity change should be aligned towards a center (i.e., towards an origin point). The image processing apparatus computes the origin point of the radial color gradient based on an orthogonality measure between a color gradient vector at a point in the raster image and a relative position vector between the point and the origin point. The image processing apparatus computes a first color gradient corresponding to a first color channel, a second color gradient corresponding to a second color channel, and a third color gradient corresponding to a third color channel. The orthogonality measure is based on the first color gradient, the second color gradient, and the third color gradient.

In some embodiments, the image processing apparatus identifies the color stops of the radial gradients and the corresponding positions with respect to the origin point. The image processing apparatus identifies a function of color intensity with respect to a radial distance from the origin point. The image processing apparatus identifies a transition point in the function of color intensity. The image processing apparatus generates a color stop based on the transition point. The color along any circle with respect to the origin point has the same color. In some examples, colors between two color stops are a blend of the colors at the corresponding stops. The image processing apparatus constructs a vector graphics representation of the radial color gradient based on the origin point and the color stops. Accordingly, the image processing apparatus generates a vector graphics image based on the vector graphics representation.

The image processing apparatus of the present disclosure perform image vectorization by calculating an origin point and a color stop to obtain a vector graphics image including smoothly shaded regions. With regards to concentric radial gradient, colors emerge from an origin point and smoothly spread outward in a circular shape. Thus, the origin point, color stops and their respective positions can be used to generate uniform-scaled concentric circles where these concentric circles are colored per user inputs based on color stops, respectively. This way, the image processing apparatus can efficiently perform image reconstruction by reconstructing radial gradients based on a raster image while preserving image details.

Embodiments of the present disclosure may be used in the context of image processing applications. For example, an image processing model based on the present disclosure may take a raster image and efficiently generate a vector graphics image depicting a radial color gradient of the raster image. For example, a vector graphics image includes colors that emerge from an origin point and smoothly spread outward in a circular shape. An example application, according to some embodiments, is provided with reference to FIG. 4. Details regarding the architecture of an example image processing apparatus are provided with reference to FIGS. 1-3. Example processes for image processing are provided with reference to FIGS. 5-16.

Network Architecture

Figure 2:
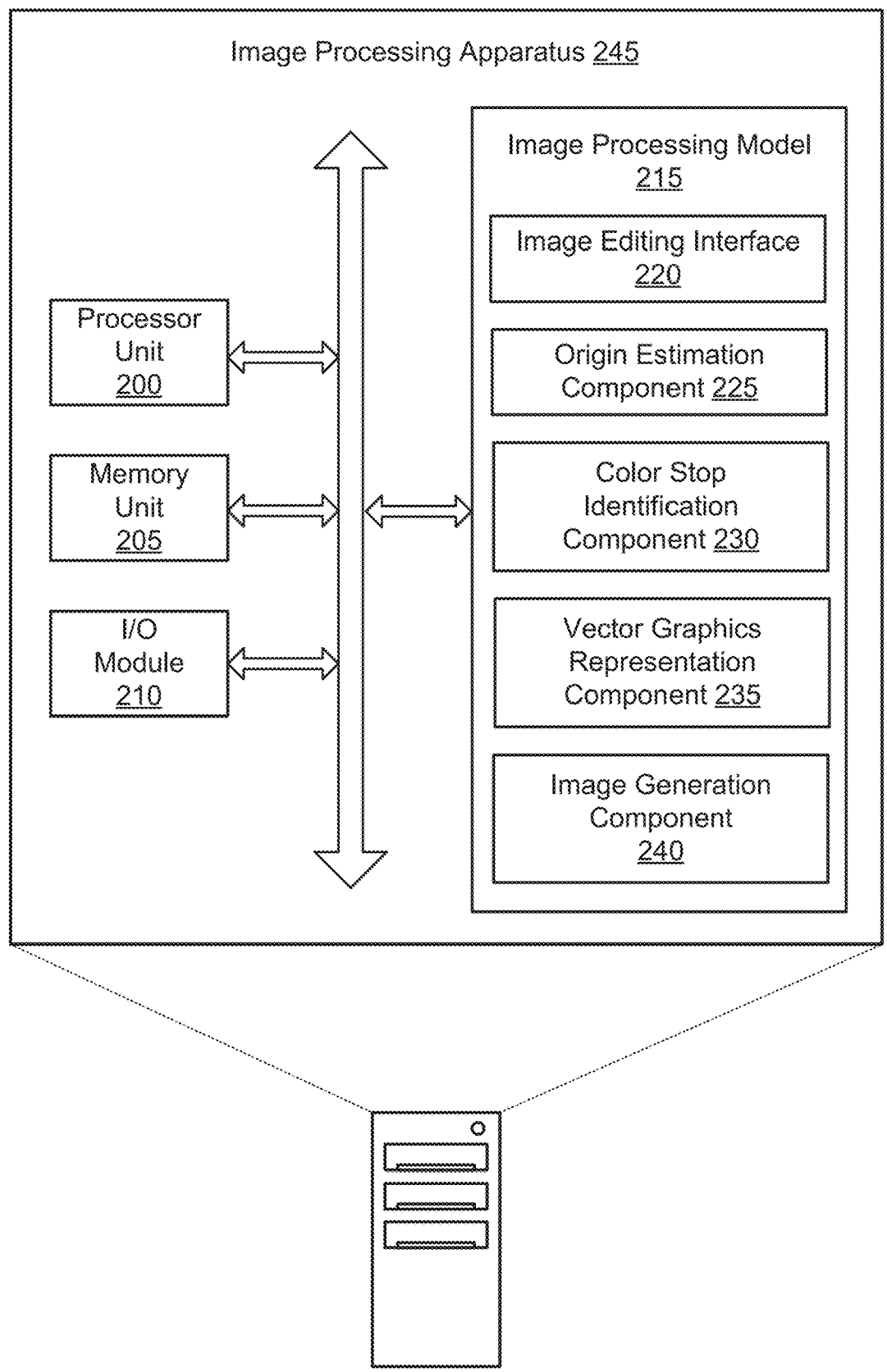
FIG. 2 shows an example of an image processing apparatus according to aspects of the present disclosure.
Figure 3:
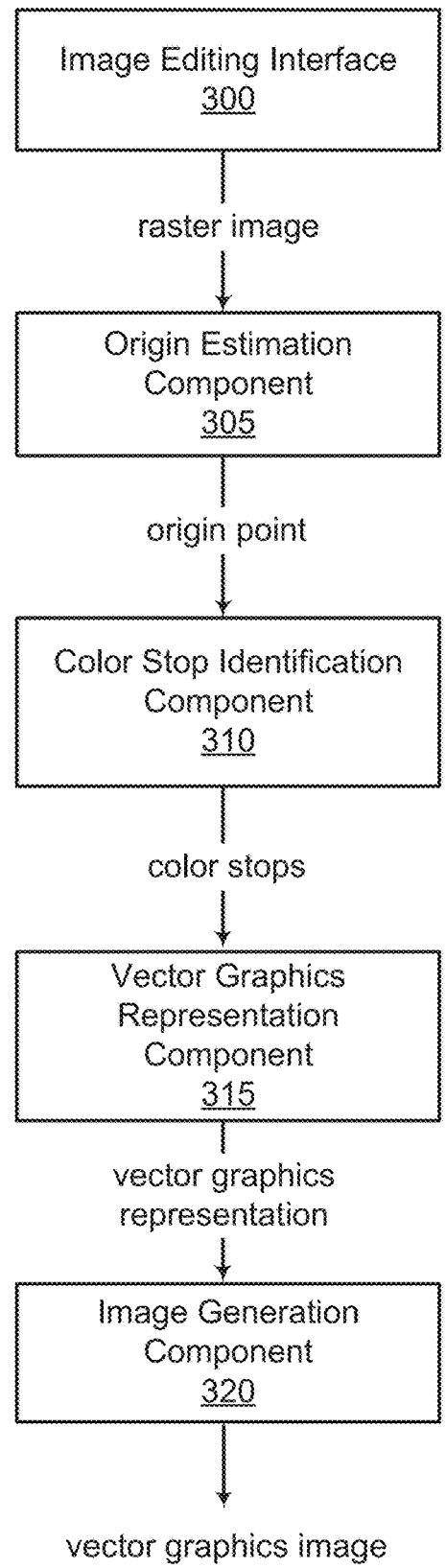
FIG. 3 shows an example of an image processing model according to aspects of the present disclosure.

In FIGS. 1-3, an apparatus and method for image processing are described. One or more embodiments of the apparatus and method include at least one processor; at least one memory including instructions executable by the at least one processor to perform the functions of: an origin estimation component configured to compute an origin point of a radial color gradient; a color stop identification component configured to compute a color stop based on a function of color intensity with respect to a radial distance from the origin point; a vector graphics representation component configured to construct a vector graphics representation of the radial color gradient based on the origin point and the color stop; and an image generation component configured to generate a vector graphics image depicting the radial color gradient based on the vector graphics representation.

Some examples of the apparatus and method further include an image editing interface configured to receive a raster image depicting the radial color gradient.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIGS. 2, 3, and 5.

User interface may enable user 100 to interact with a device. In some embodiments, a user interface may include an audio device, such as an external speaker system, an external display device such as a display screen, or an input device (e.g., remote control device interfaced with the user interface directly or through an I/O controller module). In some cases, a user interface may be a graphical user interface (GUI).

User device 105 may be a personal computer, laptop computer, mainframe computer, palmtop computer, personal assistant, mobile device, or any other suitable processing apparatus. In some examples, user device 105 includes software that incorporates an image processing application (e.g., an image editing application). The image editing application may either include or communicate with image processing apparatus 110. In some examples, the image vectorization application on user device 105 may include functions of image processing apparatus 110.

As an example shown in FIG. 1, user 100 uploads a raster image to image processing apparatus 110 via e.g., user device 105 and cloud 115. The raster image includes a number of pixels and depicts a radial color gradient. In some cases, content designers can create smoothly shaded graphics based on gradients. For example, user 100 may create a vector graphics image including color gradients based on the uploaded raster image using image processing apparatus 110.

Image processing apparatus 110 generates a vector graphics representation based on the raster image by identifying an origin point of the radial color gradient and a color stop. Image processing apparatus 110 computes an origin point of the radial color gradient based on an orthogonality measure between a color gradient vector at a point in the raster image and a relative position vector between the point and the origin point. Image processing apparatus 110 then constructs a vector graphics representation (e.g., based on the origin point and the color stop). In some examples, there are two or more color stops. Image processing apparatus 110 generates a vector graphics image depicting the radial color gradient based on the vector graphics representation.

The vector graphics image depicts colors that emerge from a center point (i.e., origin point) and smoothly spread outward in a circular shape. In some cases, the vector graphics image may be defined by an origin point and color stops. Image processing apparatus 110 returns the vector graphics image to user 100 via cloud 115 and user device 105. The process of using image processing apparatus 110 is further described with reference to FIG. 4.

Image processing apparatus 110 includes a computer implemented network comprising an image editing interface, origin estimation component, color stop identification component, vector graphics representation component, and image generation component. Image processing apparatus 110 may also include a processor unit, a memory unit, and an I/O module. Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 1-3. Further detail regarding the operation of image processing apparatus 110 is provided with reference to FIGS. 5-16.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users 100 over the Internet. Some large cloud networks have functions distributed over multiple locations from central servers. A server is designated an edge server if it has a direct or close connection to a user 100. In some cases, a cloud is limited to a single organization. In other examples, cloud 115 is available to many organizations. In one example, cloud 115 includes a multilayer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of an image processing apparatus according to aspects of the present disclosure. The example shown includes processor unit 200, memory unit 205, I/O module 210, and image processing model 215. In one embodiment, image processing model 215 includes image editing interface 220, origin estimation component 225, color stop identification component 230, vector graphics representation component 235, and image generation component 240. Image processing apparatus 245 is an example of, or includes aspects of, the corresponding element described with reference to FIG. 1. According to an embodiment, image processing apparatus 245 includes processor unit 200, memory unit 205, I/O module 210, and image processing model 215. Image processing model 215 is an example of, or includes aspects of, the corresponding element described with reference to FIG. 3.

Processor unit 200 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 200 is configured to operate a memory array using a memory controller. In other cases, a memory controller is integrated into processor unit 200. In some cases, processor unit 200 is configured to execute computer-readable instructions stored in a memory to perform various functions. In some embodiments, processor unit 200 includes special purpose components for modem processing, baseband processing, digital signal processing, or transmission processing.

Examples of memory unit 205 include random access memory (RAM), read-only memory (ROM), or a hard disk. Examples of memory unit 205 include solid state memory and a hard disk drive. In some examples, memory unit 205 is used to store computer-readable, computer-executable software including instructions that, when executed, cause a processor to perform various functions described herein. In some cases, memory unit 205 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 205 store information in the form of a logical state.

I/O module 210 includes an I/O controller. The I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

According to an embodiment, image processing model 215 receives a raster image depicting a radial color gradient. The image processing model 215 generates a vector graphics representation based on the raster image by identifying an origin point and two or more color stops. Image processing model 215 generates a vector graphics image based on the origin point and color stops. The vector graphics image depicts colors that emerge from a center point and smoothly spread outward in a circular shape. In some examples, the vector graphics image may be defined by an origin point, an ending shape (e.g., circle), and color stop points.

According to some embodiments, image editing interface 220 receives a raster image depicting a radial color gradient. In some examples, image editing interface 220 receives the raster image from a user. In some examples, image editing interface 220 receives a command from the user to convert the raster image to the vector graphics image, where the vector graphics image is generated based on the command. Image editing interface 220 is an example of, or includes aspects of, the corresponding element described with reference to FIGS. 3 and 7.

According to some embodiments, origin estimation component 225 computes an origin point of the radial color gradient based on an orthogonality measure between a color gradient vector at a point in the raster image and a relative position vector between the point and the origin point. In some examples, origin estimation component 225 computes a first color gradient corresponding to a first color channel of a set of color channels. Origin estimation component 225 computes a second color gradient corresponding to a second color channel of the set of color channels. Origin estimation component 225 computes a third color gradient corresponding to a third color channel of the set of color channels, where the orthogonality measure is based on the first color gradient, the second color gradient, and the third color gradient.

In some examples, origin estimation component 225 generates a vector field of color gradient vectors at a set of points in the raster image. Origin estimation component 225 computes a set of orthogonality measures corresponding to the set of points. Origin estimation component 225 computes a sum of the set of orthogonality measures, where the origin point is computed based on the sum. In some examples, origin estimation component 225 computes a square of each of the set of orthogonality measures, where the sum is computed based on the square of each of the set of orthogonality measures.

In some examples, origin estimation component 225 identifies a function of the orthogonality measure with respect to a dependent variable corresponding to the origin point. Origin estimation component 225 identifies a derivative of the function of the orthogonality measure. Origin estimation component 225 identifies a system of equations by setting the derivative to zero. Origin estimation component 225 solves the system of equations to identify the origin point. In some examples, origin estimation component 225 normalizes the orthogonality measure, where the origin point of the radial color gradient is computed based on the normalized orthogonality measure. Origin estimation component 225 is an example of, or includes aspects of, the corresponding element described with reference to FIG. 3.

According to some embodiments, color stop identification component 230 identifies a function of color intensity with respect to a radial distance from the origin point. In some examples, color stop identification component 230 identifies a transition point in the function of color intensity. Color stop identification component 230 generates a color stop based on the transition point, where the vector graphics representation is constructed based on the color stop. In some examples, color stop identification component 230 identifies an additional transition point in the function of color intensity. Color stop identification component 230 generates an additional color stop based on the additional transition point, where the vector graphics representation is constructed based on the additional color stop.

In some examples, color stop identification component 230 identifies the radial distance from the origin point. Color stop identification component 230 identifies a ring of points at the radial distance from the origin point. Color stop identification component 230 identifies a color intensity value corresponding to each point of the ring of points. Color stop identification component 230 averages the color intensity value across each point of the ring of points to obtain an average color intensity value, where the function of color intensity is based on the average color intensity value.

In some examples, color stop identification component 230 computes a Laplacian of the function of color intensity, where the transition point is identified based on the Laplacian. In some examples, color stop identification component 230 identifies a set of candidate transition points. Color stop identification component 230 computes a measure of non-colinearity based on the set of candidate transition points. Color stop identification component 230 filters the set of candidate transition points based on the measure of non-colinearity, where the transition point is selected based on the filtering.

According to some embodiments, color stop identification component 230 computes a color stop based on a function of color intensity with respect to a radial distance from the origin point. In some examples, color stop identification component 230 identifies a transition point in the function of color intensity, where the color stop is computed based on the transition point. Color stop identification component 230 is an example of, or includes aspects of, the corresponding element described with reference to FIG. 3.

According to some embodiments, vector graphics representation component 235 constructs a vector graphics representation of the radial color gradient based on the origin point. In some examples, vector graphics representation component 235 identifies a first color of the raster image at the origin point. Vector graphics representation component 235 identifies a second color of the raster image at a point corresponding to the color stop, where the vector graphics representation is constructed based on the first color and the second color.

According to some embodiments, vector graphics representation component 235 constructs a vector graphics representation of the radial color gradient based on the origin point and the color stop. In some cases, the vector graphics representation may be defined to include the origin point and the color stops. Vector graphics representation component 235 is an example of, or includes aspects of, the corresponding element described with reference to FIG. 3.

According to some embodiments, image generation component 240 generates a vector graphics image depicting the radial color gradient based on the vector graphics representation. Image generation component 240 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of an image processing model according to aspects of the present disclosure. Detail regarding components of the image processing model is also described in FIG. 2. The example shown includes image editing interface 300, origin estimation component 305, color stop identification component 310, vector graphics representation component 315, and image generation component 320.

According to an embodiment of the present disclosure, the image processing model is configured to extract concentric radial gradients to approximate a smoothly shaded region of a raster image. Image editing interface 300 receives a raster image, which is input to origin estimation component 305. Image editing interface 300 is an example of, or includes aspects of, the corresponding element described with reference to FIGS. 2 and 7.

As an example shown in FIG. 3, from top to bottom, origin estimation component 305 computes an origin point of the radial color gradient in the raster image in which the color intensity change is aligned towards a center (i.e., origin point). Origin estimation component 305 is an example of, or includes aspects of, the corresponding element described with reference to FIG. 2. Further, color stop identification component 310 computes a color stop based on a function of color intensity with respect to a radial distance from the origin point. Color stop identification component 310 is an example of, or includes aspects of, the corresponding element described with reference to FIG. 2. Vector graphics representation component 315 constructs a vector graphics representation of the radial color gradient based on the origin point and the color stop. In some cases, the vector graphics representation may be defined to include the origin point and one or more color stops. Vector graphics representation component 315 is an example of, or includes aspects of, the corresponding element described with reference to FIG. 2. Image generation component 320 generates a vector graphics image depicting the radial color gradient based on the vector graphics representation. Image generation component 320 is an example of, or includes aspects of, the corresponding element described with reference to FIG. 2.

Image Processing

In FIGS. 4-16, a method, apparatus, and non-transitory computer readable medium for image processing are described. One or more embodiments of the method, apparatus, and non-transitory computer readable medium include receiving a raster image depicting a radial color gradient; computing an origin point of the radial color gradient based on an orthogonality measure between a color gradient vector at a point in the raster image and a relative position vector between the point and the origin point; constructing a vector graphics representation of the radial color gradient based on the origin point; and generating a vector graphics image depicting the radial color gradient based on the vector graphics representation.

Some examples of the method, apparatus, and non-transitory computer readable medium further include computing a first color gradient corresponding to a first color channel of a plurality of color channels. Some examples further include computing a second color gradient corresponding to a second color channel of the plurality of color channels. Some examples further include computing a third color gradient corresponding to a third color channel of the plurality of color channels, wherein the orthogonality measure is based on the first color gradient, the second color gradient, and the third color gradient.

Some examples of the method, apparatus, and non-transitory computer readable medium further include generating a vector field of color gradient vectors at a plurality of points in the raster image. Some examples further include computing a plurality of orthogonality measures corresponding to the plurality of points. Some examples further include computing a sum of the plurality of orthogonality measures, wherein the origin point is computed based on the sum.

Some examples of the method, apparatus, and non-transitory computer readable medium further include computing a square of each of the plurality of orthogonality measures, wherein the sum is computed based on the square of each of the plurality of orthogonality measures.

Some examples of the method, apparatus, and non-transitory computer readable medium further include identifying a function of the orthogonality measure with respect to a dependent variable corresponding to the origin point. Some examples further include identifying a derivative of the function of the orthogonality measure. Some examples further include identifying a system of equations by setting the derivative to zero. Some examples further include solving the system of equations to identify the origin point.

Some examples of the method, apparatus, and non-transitory computer readable medium further include identifying a function of color intensity with respect to a radial distance from the origin point. Some examples further include identifying a transition point in the function of color intensity. Some examples further include generating a color stop based on the transition point, wherein the vector graphics representation is constructed based on the color stop.

Some examples of the method, apparatus, and non-transitory computer readable medium further include identifying a first color of the raster image at the origin point. Some examples further include identifying a second color of the raster image at a point corresponding to the color stop, wherein the vector graphics representation is constructed based on the first color and the second color.

Some examples of the method, apparatus, and non-transitory computer readable medium further include identifying an additional transition point in the function of color intensity. Some examples further include generating an additional color stop based on the additional transition point, wherein the vector graphics representation is constructed based on the additional color stop.

Some examples of the method, apparatus, and non-transitory computer readable medium further include identifying the radial distance from the origin point. Some examples further include identifying a ring of points at the radial distance from the origin point. Some examples further include identifying a color intensity value corresponding to each point of the ring of points. Some examples further include averaging the color intensity value across each point of the ring of points to obtain an average color intensity value, wherein the function of color intensity is based on the average color intensity value.

Some examples of the method, apparatus, and non-transitory computer readable medium further include computing a Laplacian of the function of color intensity, wherein the transition point is identified based on the Laplacian.

Some examples of the method, apparatus, and non-transitory computer readable medium further include identifying a plurality of candidate transition points. Some examples further include computing a measure of non-colinearity based on the plurality of candidate transition points. Some examples further include filtering the plurality of candidate transition points based on the measure of non-colinearity, wherein the transition point is selected based on the filtering.

Some examples of the method, apparatus, and non-transitory computer readable medium further include receiving the raster image from a user. Some examples further include receiving a command from the user to convert the raster image to the vector graphics image, wherein the vector graphics image is generated based on the command.

Some examples of the method, apparatus, and non-transitory computer readable medium further include normalizing the orthogonality measure, wherein the origin point of the radial color gradient is computed based on the normalized orthogonality measure.

A method, apparatus, and non-transitory computer readable medium for image processing are described. One or more embodiments of the method, apparatus, and non-transitory computer readable medium include receiving a raster image depicting a radial color gradient; computing an origin point of the radial color gradient; computing a color stop based on a function of color intensity with respect to a radial distance from the origin point; constructing a vector graphics representation of the radial color gradient based on the origin point and the color stop; and generating a vector graphics image depicting the radial color gradient based on the vector graphics representation.

Some examples of the method, apparatus, and non-transitory computer readable medium further include identifying a transition point in the function of color intensity, wherein the color stop is computed based on the transition point.

Some examples of the method, apparatus, and non-transitory computer readable medium further include computing the origin point of the radial color gradient based on an orthogonality measure between a color gradient vector at a point in the raster image and a relative position vector between the point and the origin point.

Some examples of the method, apparatus, and non-transitory computer readable medium further include identifying a first color of the raster image at the origin point. Some examples further include identifying a second color of the raster image at a point corresponding to the color stop, wherein the vector graphics representation is constructed based on the first color and the second color.

Some examples of the method, apparatus, and non-transitory computer readable medium further include identifying an additional transition point in the function of color intensity. Some examples further include generating an additional color stop based on the additional transition point, wherein the vector graphics representation is constructed based on the additional color stop.

Figure 4:
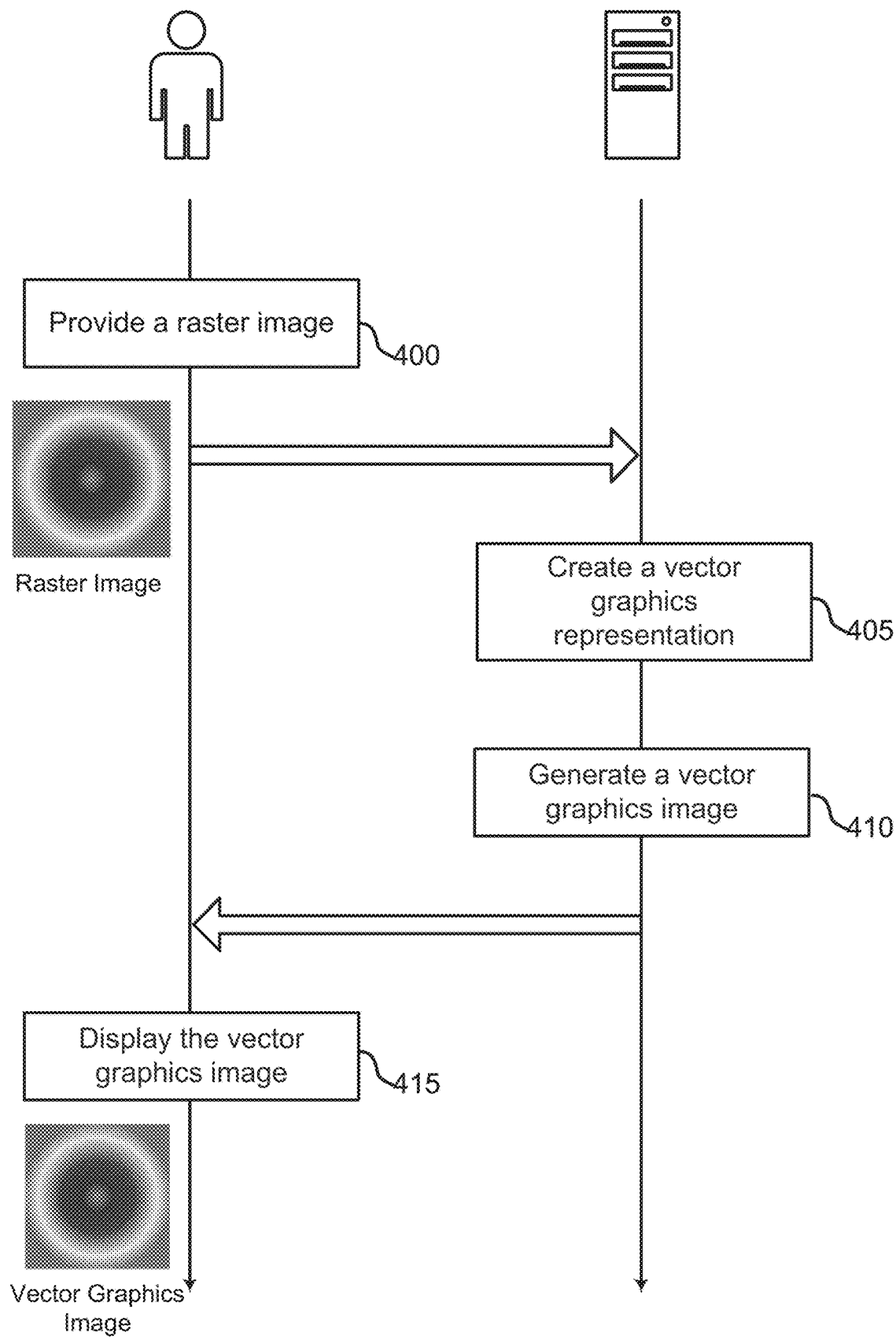
FIG. 4 shows an example of image processing application according to aspects of the present disclosure.

FIG. 4 shows an example of image processing application according to aspects of the present disclosure. In some examples, these operations are performed by a system including a processor executing a set of codes to control functional elements of an apparatus, such as image processing apparatus 245 as shown in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 400, the user provides a raster image. In some cases, the operations of this step refer to, or may be performed by, a user as described with reference to FIG. 1. For example, the user is a content designer and uploads a raster image having a number of pixels. The user wants to produce a smoothly shaded vector graphics image using image processing apparatus 245 as shown in FIG. 2. The user can re-size the vector graphics image infinitely larger or smaller, and the image still shows just as clearly.

At operation 405, the system creates a vector graphics representation based on the raster image. In some cases, the operations of this step refer to, or may be performed by, an image processing apparatus as described with reference to FIG. 1. In some examples, the image processing apparatus is configured to perform image vectorization to reconstruct a vector graphics image based on a raster image using the extracted radial gradients. According to an embodiment, the vector graphics representation includes an origin point and one or more color stops.

At operation 410, the system generates a vector graphics image based on the vector graphics representation. In some cases, the operations of this step refer to, or may be performed by, an image processing apparatus as described with reference to FIG. 1.

At operation 415, the system displays the vector graphics image to the user. In some cases, the operations of this step refer to, or may be performed by, an image processing apparatus as described with reference to FIG. 1. For example, the vector graphics image depicts a smoothly shaded shapes or regions. The user can edit the vector graphics image such as modify the color or transition of colors by manipulating the color stops.

Figure 5:
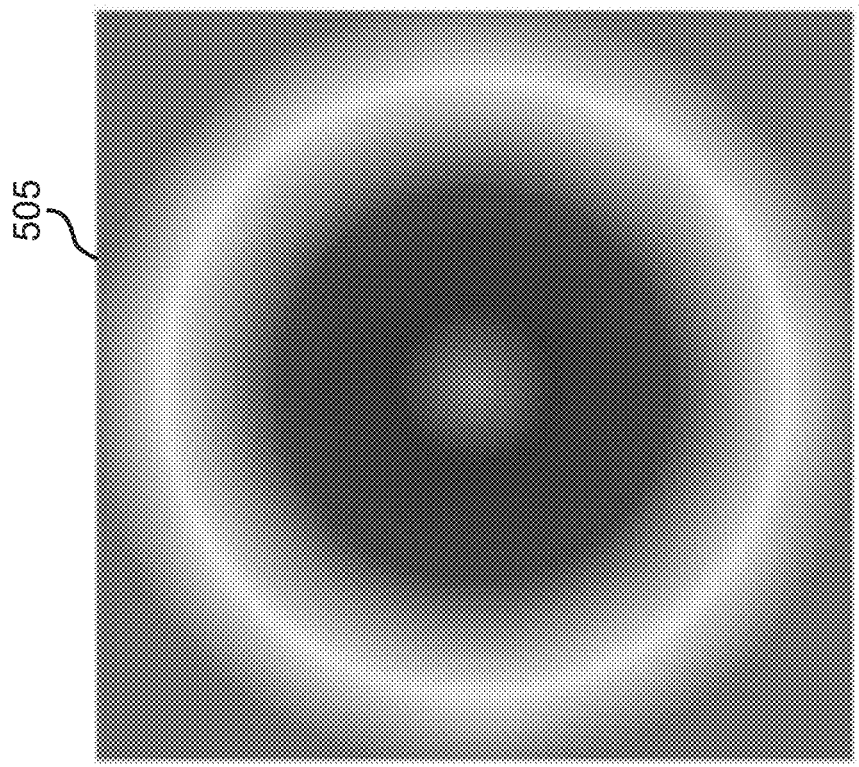
FIG. 5 shows an example of concentric radial gradient reconstruction according to aspects of the present disclosure.
Figure 5:
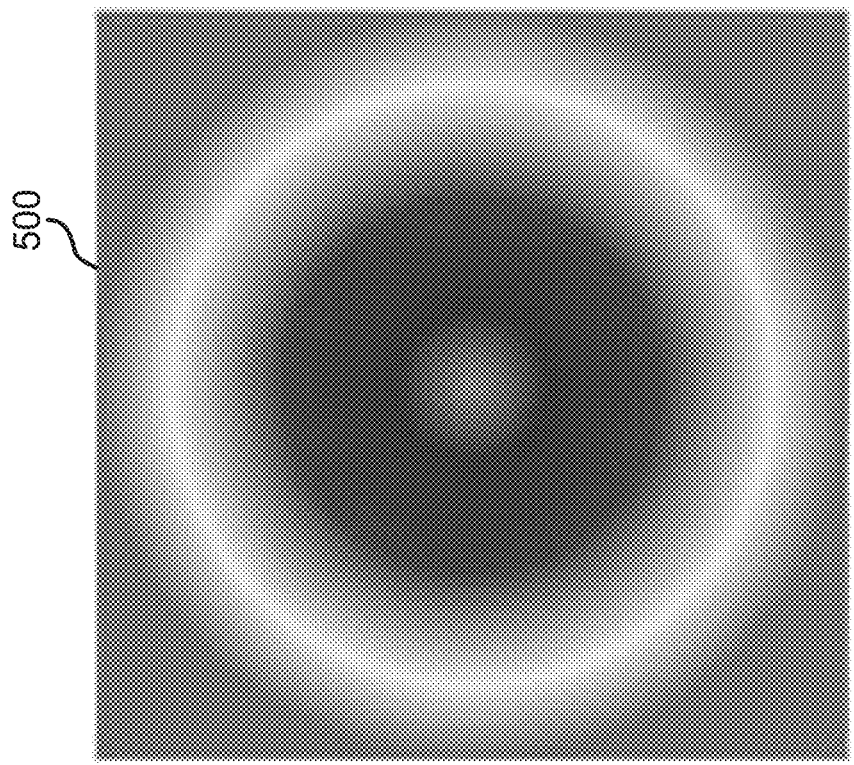

FIG. 5 shows an example of concentric radial gradient reconstruction according to aspects of the present disclosure. The example shown includes raster image 500 and vector graphics image 505. Image processing model 215 shown in FIG. 2 converts raster image 500 to vector graphics image 505. For example, a raster image is resolution dependent and characterized by the width and height of the image in pixels and by the number of bits per pixel. In some examples, raster image 500 is stored in image files of different image formats (e.g., JPEG, GIF, PNG images). Raster image 500 is an example of, or includes aspects of, the corresponding element described with reference to FIGS. 6 and 7.

According to an embodiment, image processing model 215 generates vector graphics image 505 based on raster image 500 through computing an origin point, color stops, and the location of the color stops. Vector graphics image 505 looks substantially similar compared to raster image 500 in terms of shading of the color and change in the color. For example, a vector graphics image refers to images created from geometric shapes defined on a cartesian plane, such as using points, lines, curves, polygons, or any combination thereof. Unlike raster image 500, vector graphics images 505 stays clear when it is resized to fill a bigger or smaller space (i.e., not distorted or blurry when zooming in). In some examples, vector image 505 is stored in image files with varying formats (e.g., svg). Vector graphics image 505 is an example of, or includes aspects of, the corresponding element described with reference to FIGS. 6 and 7.

Figure 6:
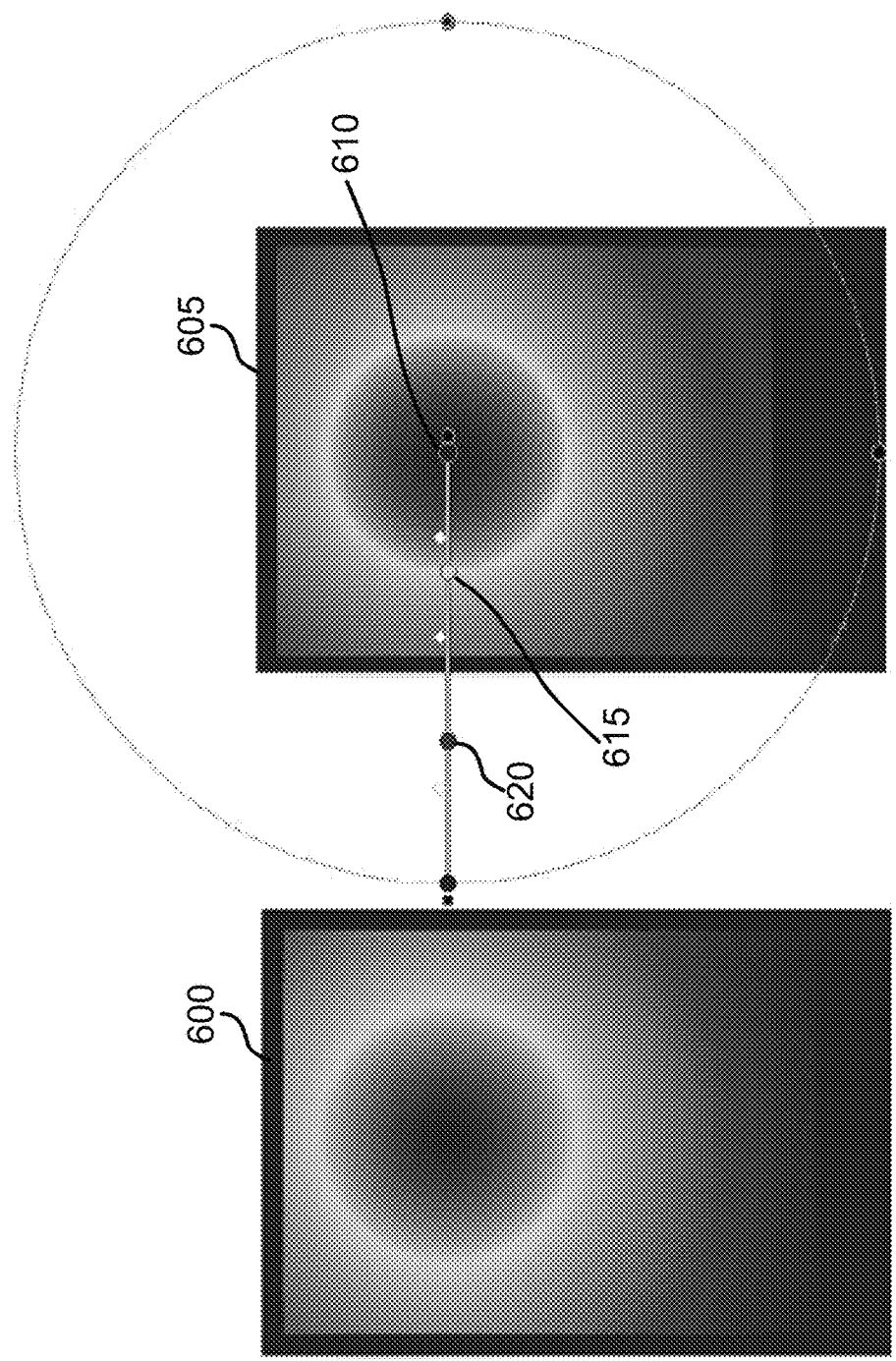
FIG. 6 shows an example of extracting concentric radial gradient from an image according to aspects of the present disclosure.

FIG. 6 shows an example of extracting concentric radial gradient from an image according to aspects of the present disclosure. The example shown includes raster image 600, vector graphics image 605, origin point 610, first color stop 615, second color stop 620, and radial distance. Raster image 600 is an example of, or includes aspects of, the corresponding element described with reference to FIGS. 1, 2, and 5. FIG. 6 shows results of image vectorization based on first color stop 615, second color stop 620, and radial distance. In some cases, radial distance is defined as the distance between origin point 610 to a color stop and the radial distance may vary. Radial distance may vary depending on the color stop. In some examples, a radial distance is the distance between origin point 610 to first color stop 615. In some examples, a radial distance is the distance between origin point 610 to second color stop 620.

Raster image 600 is an example of, or includes aspects of, the corresponding element described with reference to FIGS. 5 and 7. For example, the raster image is defined by pixels. Vector graphics image 605 is an example of, or includes aspects of, the corresponding element described with reference to FIGS. 5 and 7. For example, the vector graphics representation includes the reconstructed gradients, color ramp, and color stops of the gradient.

Image processing apparatus 245 of FIG. 2 is used to vectorize raster image 600 based on change in color intensity defined by a radial gradient. Image processing apparatus reconstructs vector graphics image 605 with a concentric radial gradient based on first color stop 615, second color stop 620, and respective radial distance. Image processing apparatus constructs smoothly shaded vector graphics based on raster image 600.

For example, origin point 610 represents a center point from which colors emerge and smoothly spread outward in a circular shape. Origin point 610 is an example of, or includes aspects of, the corresponding element described with reference to FIGS. 7, 9, and 12.

According to an embodiment, uniformly scaled concentric circles are colored based on first color stop 615 and second color stop 620. In some examples, first color stop 615 and the second color stop 620 are positioned on a virtual gradient ray. First color stop 615 is an example of, or includes aspects of, the corresponding element described with reference to FIG. 7. Second color stop 620 is an example of, or includes aspects of, the corresponding element described with reference to FIG. 7.

Figure 7:
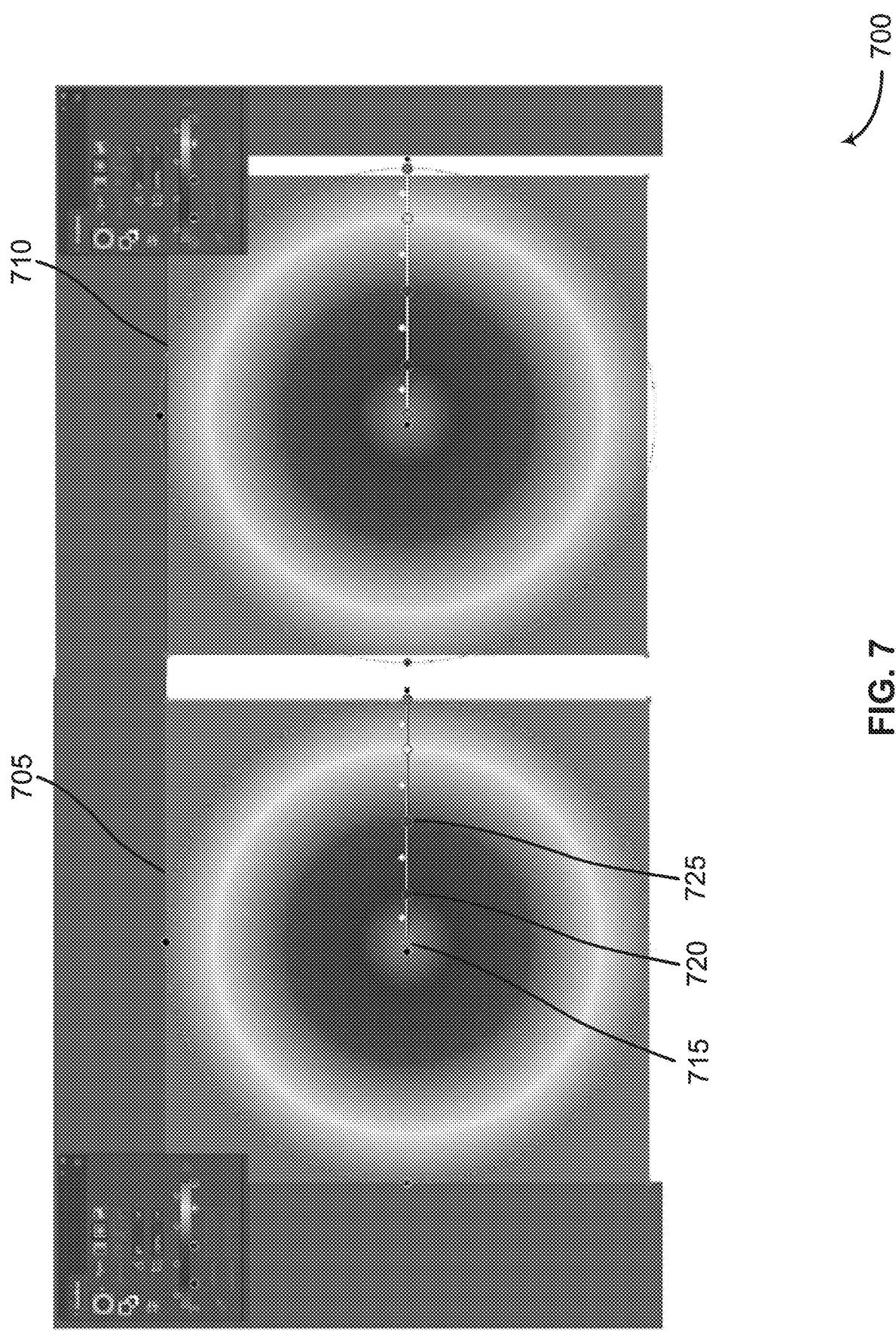
FIG. 7 shows an example of an image editing interface according to aspects of the present disclosure.

FIG. 7 shows an example of an image editing interface 700 according to aspects of the present disclosure. The example shown includes image editing interface 700, raster image 705, vector graphics image 710, origin point 715, first color stop 720, second color stop 725, and radial distance. In some cases, the color stops and position are known. A user selects the raster image, image processing model 215 computes the origin point, radial distance, and colors stops based on raster image 705.

Image editing interface 700 is an example of, or includes aspects of, the corresponding element described with reference to FIGS. 2 and 3. Raster image 705 is an example of, or includes aspects of, the corresponding element described with reference to FIGS. 5 and 6. Vector graphics image 710 is an example of, or includes aspects of, the corresponding element described with reference to FIGS. 5 and 6. Origin point 715 is an example of, or includes aspects of, the corresponding element described with reference to FIGS. 6, 9, and 12.

Color stop identification component 230 shown in FIG. 2 computes a set of candidate color stops and identifies first color stop 720 and second color stop 725 from the set of candidate color stops. First color stop 720 is an example of, or includes aspects of, the corresponding element described with reference to FIG. 6. Second color stop 725 is an example of, or includes aspects of, the corresponding element described with reference to FIG. 6.

Figure 8:
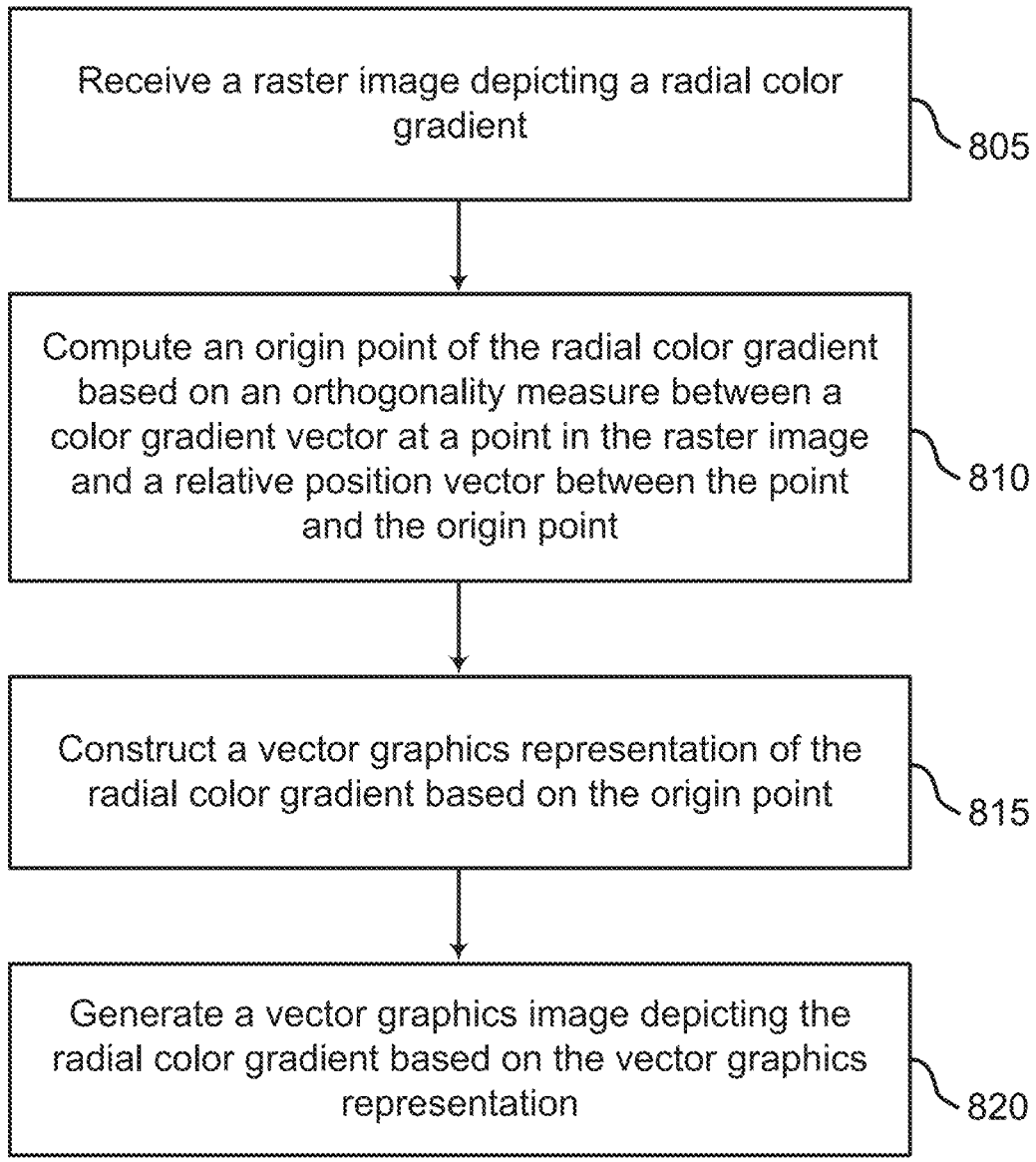
FIG. 8 shows an example of a method for generating a vector graphics image according to aspects of the present disclosure.

FIG. 8 shows an example of a method for generating a vector graphics image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a raster image depicting a radial color gradient. In some cases, the operations of this step refer to, or may be performed by, an image editing interface as described with reference to FIGS. 2, 3, and 7. In some examples, a raster image refers to a class of digital images that are resolution dependent and the image quality is determined by the location, size, or color of the pixels. Raster images may be in JPEG, GIF, PNG, or other image file formats. The quality of a raster image is dependent on the dimension of the image. For example, a raster image may become blurred or pixelated due to an increase in size or when zooming in.

In some examples, a radial color gradient represents a vector field measuring the change in color intensity. The radial color gradient is extracted from a superpixel (i.e., closed and compact set of points in a 2D space). In some cases, a radial color gradient may include a range of colors that vary by their respective position from the center of a circle. Radial gradients may be defined based on the center of a circle and one or more color stop points. The color can be used to fill a region, thus producing a smooth color transition.

At operation 810, the system computes an origin point of the radial color gradient based on an orthogonality measure between a color gradient vector at a point in the raster image and a relative position vector between the point and the origin point. In some cases, the operations of this step refer to, or may be performed by, an origin estimation component as described with reference to FIGS. 2 and 3. In some cases, the color of a superpixel is defined by a radial color gradient, and accordingly the directions in which the color intensity change are aligned towards a center of a circle (i.e., the origin point). Detail with regards to computing an origin point of the radial color gradient will be described in FIGS. 9-13.

At operation 815, the system constructs a vector graphics representation of the radial color gradient based on the origin point. In some cases, the operations of this step refer to, or may be performed by, a vector graphics representation component as described with reference to FIGS. 2 and 3. In some cases, the vector graphics representation includes the origin point and one or more color stops.

At operation 820, the system generates a vector graphics image depicting the radial color gradient based on the vector graphics representation. In some cases, the operations of this step refer to, or may be performed by, an image generation component as described with reference to FIGS. 2 and 3. In some examples, a vector graphics image keeps track of points and the equations for the lines that connect them. Vector graphics images are made up of paths or line objects that can be infinitely scalable because they do not depend on pixels. Users can re-size a vector graphics image infinitely larger or smaller, and the vector image still shows just as clearly. Users can continue to edit the vector graphics image to modify color of different regions.

Origin Point

Figure 9:
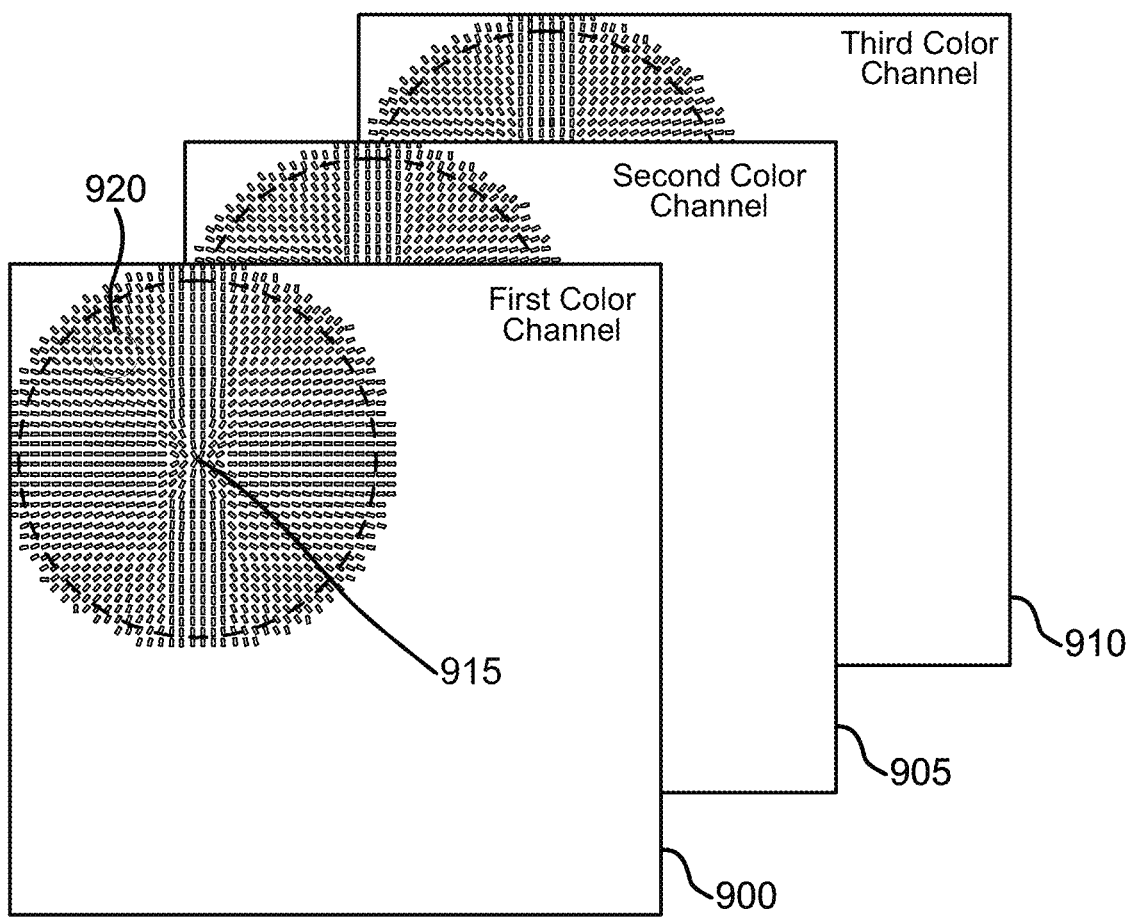
FIG. 9 shows an example of color gradient vector field for three channels according to aspects of the present disclosure.

FIG. 9 shows an example of color gradient vector field for three channels according to aspects of the present disclosure.

The example shown includes first color channel 900, second color channel 905, third color channel 910, origin point 915, and radial color gradient 920.

According to an embodiment of the present disclosure, image processing model 215 (see FIG. 2) extracts radial gradients from a superpixel. A superpixel is defined as a 2D region in space. That is, a superpixel $\mathfrak{S}$ is defined as a closed, compact set of points in $\mathbb{R}^2$. The color of a pixel $p \in \mathfrak{S}$ is $C(p)=[C_R \ C_G \ C_B]$ defined by the three color channels. In some examples, the color channels include first color channel 900, second color channel 905, and third color channel 910.

According to an embodiment, origin estimation component 225 (as shown in FIG. 2) is configured to use the direction of alignment of the color intensity to detect whether a superpixel can be represented using a radial gradient. Further, origin estimation component 225 estimates the degree of alignment towards an origin followed by computing the origin point based on a normalized orthogonality measure between a color gradient vector and a relative position vector between the point and the origin point. A Gaussian filter is applied to smoothen the image to reduce anomaly in the pixel color intensities. Optimization task is made robust by normalizing the vector field pointing towards the center. In some examples, least-square error (LSE) minimization is used to estimate the origin point o.

In some examples, the color of a superpixel is defined by a radial color gradient, and accordingly the directions in which the color intensity change are aligned towards a center (i.e., origin point). Origin point 915 is an example of, or includes aspects of, the corresponding element described with reference to FIGS. 6, 7, and 12.

In some examples, the image processing apparatus assigns a vector direction to indicate the direction of color change. The shading of the color changes gradually which represents the direction of alignment of the vectors. The directions of the vector are aligned to point to the center of the image. Then, the pixel colors along a radius of the circle are averaged to obtain an average color intensity for the radial distance.

Figure 10:
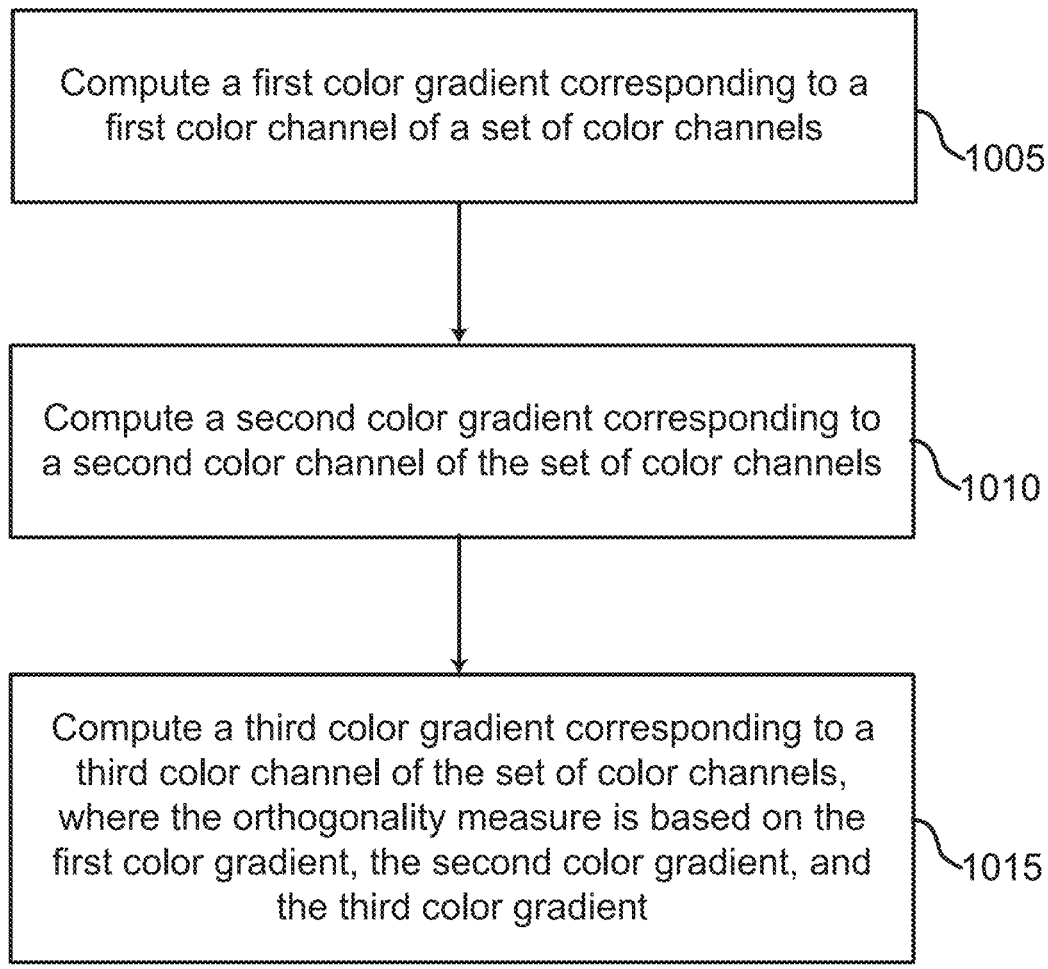
FIG. 10 shows an example of a method for computing color gradients according to aspects of the present disclosure.

FIG. 10 shows an example of a method for computing color gradients according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system computes a first color gradient corresponding to a first color channel of a set of color channels. In some cases, the operations of this step refer to, or may be performed by, an origin estimation component as described with reference to FIGS. 2 and 3.

At operation 1010, the system computes a second color gradient corresponding to a second color channel of the set of color channels. In some cases, the operations of this step refer to, or may be performed by, an origin estimation component as described with reference to FIGS. 2 and 3.

At operation 1015, the system computes a third color gradient corresponding to a third color channel of the set of color channels, where the orthogonality measure is based on the first color gradient, the second color gradient, and the third color gradient. In some cases, the operations of this step refer to, or may be performed by, an origin estimation component as described with reference to FIGS. 2 and 3.

According to an embodiment of the present disclosure, image processing model 215 (see FIG. 2) extracts radial gradients from a superpixel. A superpixel is defined as a 2d region in space. That is, a superpixel $\mathfrak{S}$ is defined as a closed, compact set of points in $\mathbb{R}^2$. The color of a pixel p∈ $\mathfrak{S}$ is C(p)=[$C_R$ $C_G$ $C_B$] defined by three color channels.

Color gradient represents a vector field that defines the change in color intensity as follows:

$$dC = [\overrightarrow{dC_R}\ \overrightarrow{dC_G}\ \overrightarrow{dC_B}] = \left[\left(\frac{\partial C_R}{\partial x}, \frac{\partial C_R}{\partial y}\right)\left(\frac{\partial C_G}{\partial x}, \frac{\partial C_G}{\partial y}\right)\left(\frac{\partial C_B}{\partial x}, \frac{\partial C_B}{\partial y}\right)\right] \quad (1)$$

The above equation computes a first color gradient corresponding to a first color channel $\overrightarrow{dC_R}$, a second color gradient corresponding to a second color channel $\overrightarrow{dC_G}$, and a third color gradient corresponding to a third color channel $\overrightarrow{dC_B}$. In some examples, this is calculated numerically using spatial difference operators, such as Sobel operator.

Figure 11:
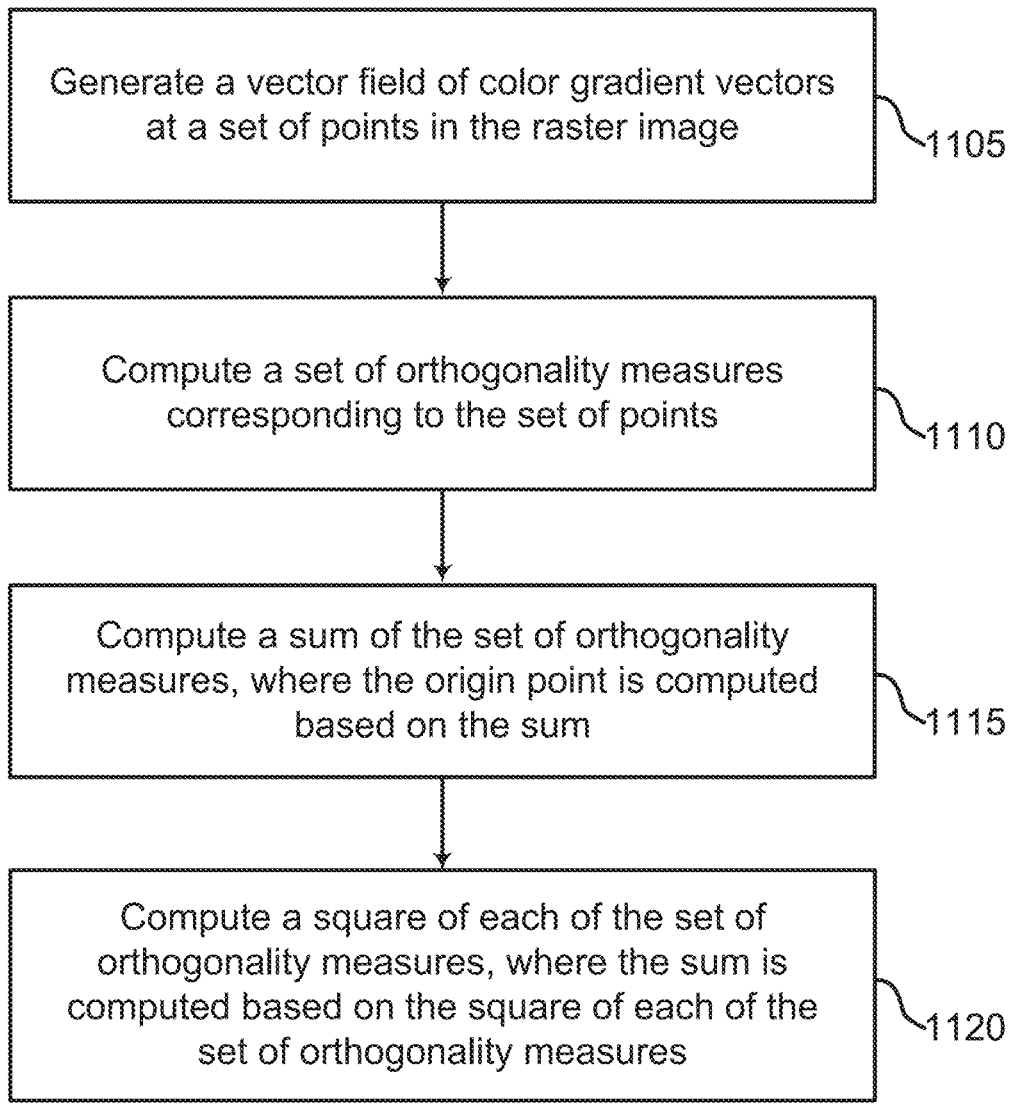
FIG. 11 shows an example of a method for computing a sum of orthogonality measures according to aspects of the present disclosure.

FIG. 11 shows an example of a method for computing a sum of orthogonality measures according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1105, the system generates a vector field of color gradient vectors at a set of points in the raster image. In some cases, the operations of this step refer to, or may be performed by, an origin estimation component as described with reference to FIGS. 2 and 3. In some cases, color gradient represents a vector field that defines the change in color intensity. For example, the change in color intensity can be calculated numerically using spatial difference operators, e.g., the Sobel operator.

According to an embodiment, if the color of a superpixel is defined by a radial gradient, the directions in which the color intensity change are aligned towards a center (i.e., origin point). Image processing model 215 relies on the direction of alignment of the color intensity to detect whether a superpixel can be represented using a radial gradient. The sample variance $S^2(C(p))<\epsilon$; p∈ $\mathfrak{S}$ is observed to detect whether superpixel color is defined by a solid fill because the change in color intensity for a solid fill is negligible.

At operation 1110, the system computes a set of orthogonality measures corresponding to the set of points. In some cases, the operations of this step refer to, or may be performed by, an origin estimation component as described with reference to FIGS. 2 and 3.

The pixel color gradients are considered to distinguish between linear gradients and radial gradients. The color gradients in the three color channels are aligned towards a center in radial gradients. The following equation estimates the degree of alignment towards an origin o:

$$E(o) = \sum_{p \in \mathfrak{S}, c \in R,G,B} \overrightarrow{dC_c}(p) \cdot \perp \cdot (p-o) \quad (2)$$

The quantity E(o), where o is the estimated origin point, tends to approach zero when o is close to the actual origin. Thus, the origin point o*=argmin$_o$E($\overrightarrow{d}$) is the solution to the optimization.

For example, in the above equation, $\overrightarrow{dC_c}(p)\cdot\perp\cdot(p-o)$ is referred to as an orthogonality measure between a color gradient vector at a point $\overrightarrow{dC_c}(p)$ in the raster image and a relative position vector (p–o) between the point and the origin point. o denotes the origin point.

At operation 1115, the system computes a sum of the set of orthogonality measures, where the origin point is computed based on the sum. In some cases, the operations of this step refer to, or may be performed by, an origin estimation component as described with reference to FIGS. 2 and 3. The following optimization is formulated to estimate the origin point:

$$o^* = \underset{o \in \mathfrak{S}}{\operatorname{argmin}} \sum_{p \in \mathfrak{S}, c \in R,G,B} \overrightarrow{dC_c}(p) \cdot \perp \cdot (p-o) \quad (3)$$

Under a regularity condition, the radial gradients are defined equally in their directions with regards to the center, i.e., the radial gradients are not biased in a particular direction.

At operation 1120, the system computes a square of each of the set of orthogonality measures, where the sum is computed based on the square of each of the set of orthogonality measures. In some cases, the operations of this step refer to, or may be performed by, an origin estimation component as described with reference to FIGS. 2 and 3. Equation 3 can be modified as follows:

$$o^* = \underset{o \in \mathfrak{S}}{\operatorname{argmin}} \sum_{p \in \mathfrak{S}, c \in R,G,B} \left(\overrightarrow{dC_c}(p) \cdot \perp \cdot (p-o)\right)^2 \quad (4)$$

As illustrated in the above equation, the origin estimation component computes a sum of the set of orthogonality measures. The origin point o* is computed based on the sum. The origin estimation component computes a square of each of the set of orthogonality measures, where the sum is computed based on the square of each of the set of orthogonality measures.

Figure 12:
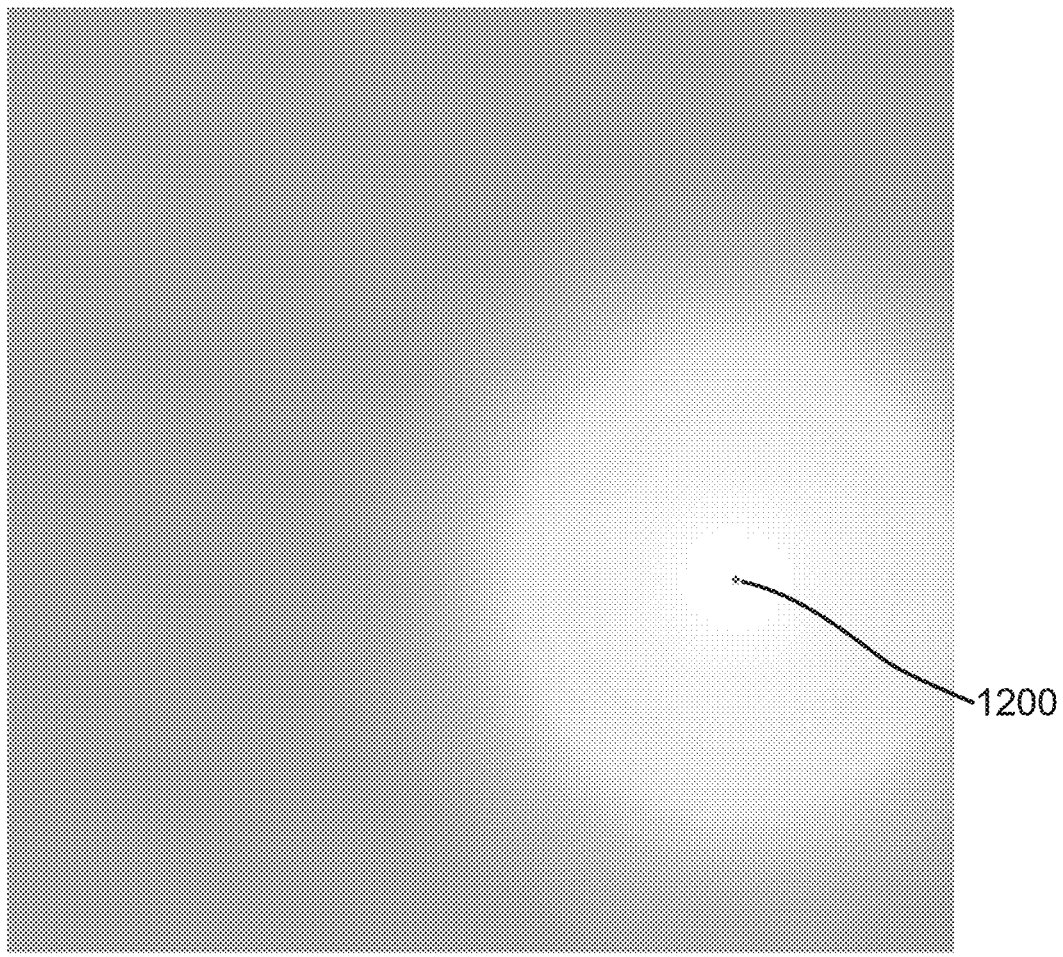
FIG. 12 shows an example of an origin point of radial gradient according to aspects of the present disclosure.

FIG. 12 shows an example of an origin point 1200 of radial gradient according to aspects of the present disclosure. For example, the color of a superpixel may be defined by a radial color gradient, the directions in which the color intensity change are aligned towards a center (i.e., origin point 1200). In some examples, the radial gradients are defined equally in their directions with regards to the center, i.e., the radial gradients are not biased in a particular direction. Filtering is performed followed by optimization to obtain the origin point.

Origin point 1200 is an example of, or includes aspects of, the corresponding element described with reference to FIGS. 6, 7, and 9. In some examples, a Gaussian filter is applied to smoothen the image to reduce minor anomalies in the pixel color intensities. Furthermore, the optimization task is made robust by normalizing the vector field pointing towards the center. Finally, a least-square error minimization method is used to estimate the origin point o.

Figure 13:
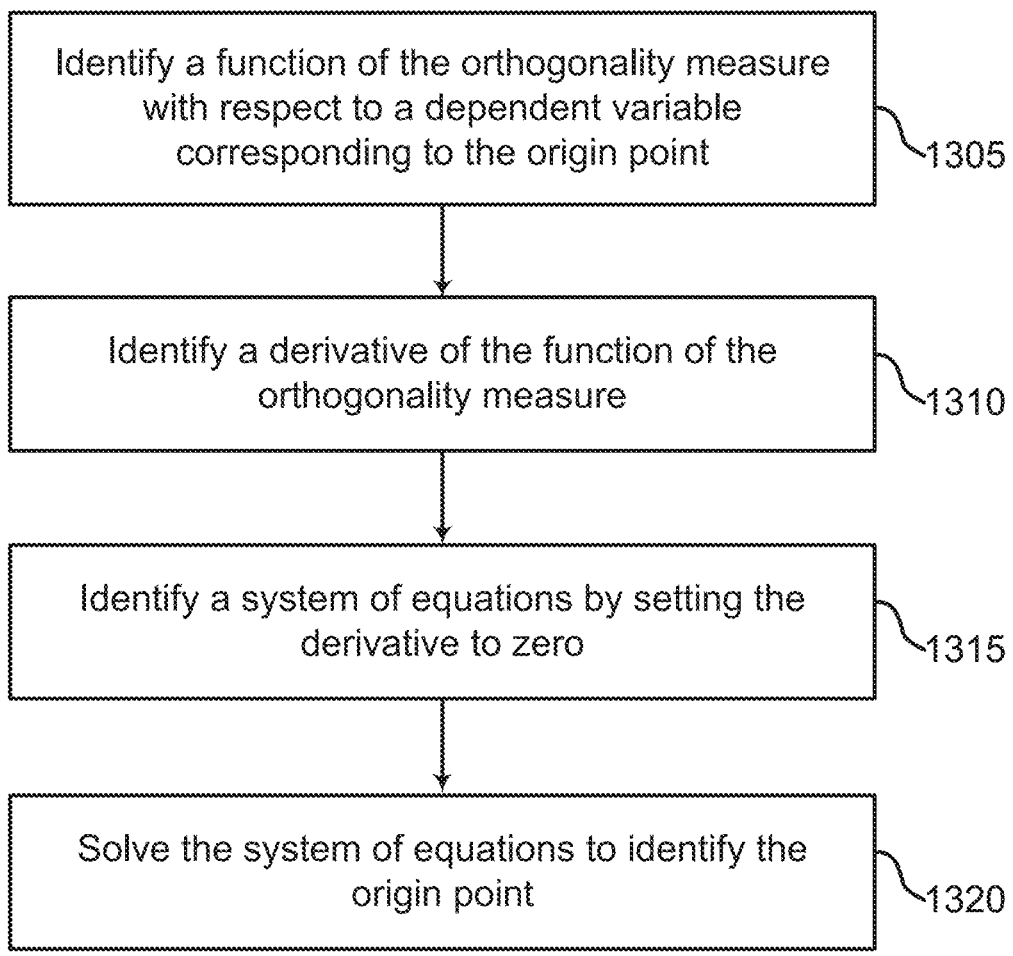
FIG. 13 shows an example of a method for computing an origin point of a radial color gradient according to aspects of the present disclosure.

FIG. 13 shows an example of a method for computing an origin point of a radial color gradient according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system identifies a function of the orthogonality measure with respect to a dependent variable corresponding to the origin point. In some cases, the operations of this step refer to, or may be performed by, an origin estimation component as described with reference to FIGS. 2 and 3. The origin estimation component includes iterative optimization which is robust in the presence of noise and artifacts. Further, the iterative optimization is performed to estimate the origin point based on normalization of the vector field pointing towards the center of the circle. For example, the origin estimation component estimates the origin point via least square error minimization.

At operation 1310, the system identifies a derivative of the function of the orthogonality measure. In some cases, the operations of this step refer to, or may be performed by, an origin estimation component as described with reference to FIGS. 2 and 3. According to an embodiment, the orthogonality measure (i.e., Equation (4) above) has an analytical solution. The origin estimation component identifies a function of the orthogonality measure with respect to a dependent variable corresponding to the origin point, i.e., E(o). The orthogonality measure can be re-written as follows:

$$E(o) := \sum_{p \in \tilde{\mathfrak{S}}} \sum_{c \in R,G,B} \left( \frac{\partial C_c}{\partial x}(p) \cdot (p_y - o_y) - \frac{\partial C_c}{\partial y}(p) \cdot (p_x - o_x) \right)^2 \quad (5)$$

where $\partial C_c/\partial x$ (p) and $\partial C_c/\partial y$ (p) are the x and y components of $\overrightarrow{dC_c}(p)$, respectively.

At operation 1315, the system identifies a system of equations by setting the derivative to zero. In some cases, the operations of this step refer to, or may be performed by, an origin estimation component as described with reference to FIGS. 2 and 3. The origin estimation component identifies a derivative of the function of the orthogonality measure dE/do. The derivative of E with respect to o gives:

$$\frac{dE}{do} = \begin{pmatrix} \sum_{p \in \tilde{\mathfrak{S}}} \sum_{c \in R,G,B} \frac{\partial C_c}{\partial y} \frac{\partial C_c}{\partial x} p_y + \frac{\partial C_c}{\partial y} \frac{\partial C_c}{\partial x} o_y + \frac{\partial C_c^2}{\partial y} p_x - \frac{\partial C_c^2}{\partial y} o_x \\ \sum_{p \in \tilde{\mathfrak{S}}} \sum_{c \in R,G,B} -\frac{\partial C_c}{\partial y} \frac{\partial C_c}{\partial x} p_x + \frac{\partial C_c}{\partial x} \frac{\partial C_c}{\partial y} o_x + \frac{\partial C_c^2}{\partial x} p_y - \frac{\partial C_c^2}{\partial x} o_y \end{pmatrix}$$

Hence, the optimal o is defined by setting dE/do to 0 which leads to a system of linear equations in two variables.

At operation 1320, the system solves the system of equations to identify the origin point. In some cases, the operations of this step refer to, or may be performed by, an origin estimation component as described with reference to FIGS. 2 and 3. According to an embodiment, the origin estimation component solves the system of equations to identify the origin point. The system of equations can be written in matrix representation as follows:

$$\begin{pmatrix} -\sum \frac{\partial C_c^2}{\partial y} & \sum \frac{\partial C_c}{\partial x} \frac{\partial C_c}{\partial y} \\ \sum \frac{\partial C_c}{\partial x} \frac{\partial C_c}{\partial y} & -\sum \frac{\partial C_c^2}{\partial x} \end{pmatrix} \cdot \begin{pmatrix} o_x \\ o_y \end{pmatrix} = \begin{pmatrix} \sum \frac{\partial C_c}{\partial x} \frac{\partial C_c}{\partial y} p_y - \frac{\partial C_c^2}{\partial y} p_x \\ \sum \frac{\partial C_c}{\partial x} \frac{\partial C_c}{\partial y} p_x - \frac{\partial C_c^2}{\partial y} p_y \end{pmatrix} \quad (6)$$

Equation 6 above computes the value of origin o. A Gaussian filter is used to smoothen the image to reduce anomalies in the pixel color intensities. Furthermore, the optimization task is made robust by normalizing the vector field pointing towards the center. The origin estimation component, via equation (7), normalizes the orthogonality measure, where the origin point of the radial color gradient is computed based on the normalized orthogonality measure. Least-square error minimization is used to estimate the origin point o as follows:

$$o^* = \underset{o \in \tilde{\mathfrak{S}}}{\operatorname{argmin}} \sum_{p \in \tilde{\mathfrak{S}}, c \in R,G,B} \overrightarrow{dC_c}(p) \cdot \perp \cdot (p-o)/\|p-o\| \quad (7)$$

Color Stops

Figure 14:
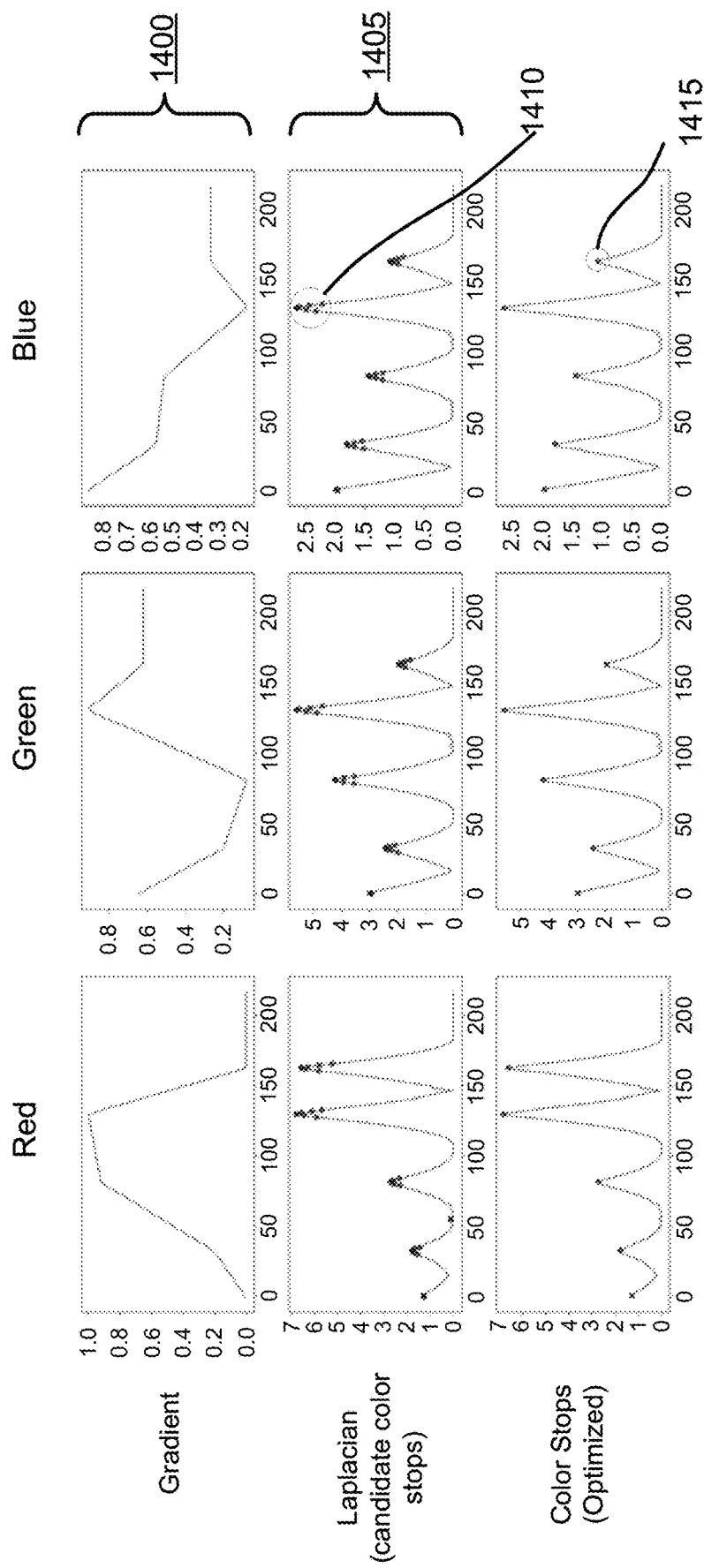
FIG. 14 shows an example of radial color gradient and color stops according to aspects of the present disclosure.

FIG. 14 shows an example of radial color gradient and color stops according to aspects of the present disclosure. The example shown includes function of color intensity 1400, Laplacian diagram 1405, candidate color stops 1410, and color stop 1415. For example, function of color intensity 1400 represents a change in color intensity or color gradient based on a vector field. A Laplacian filter is applied to the color profile to identify the sharp changes or peaks indicating the presence of color stop 1415 in Laplacian diagram 1405.

According to an embodiment of the present disclosure, image processing model 215 generates the color stops and identifies the corresponding positions of the color stops, respectively. For example, two points $p_0$, $p_1$ are considered co-circular with respect to origin point o if and only if the points are equidistant from the origin point o. Let $\sim^o$ defines the relation and the symbol $\sim$ denotes an equivalence relation:

$$p_0 \sim p_1 \text{ iff } \|p_0 - o\| = \|p_1 - o\| \quad (8)$$

According to an embodiment, let $\Omega$ be the equivalence class. An equivalence class may form a circle with o as center. Thus, the equivalence class $\Omega$ is a collection of concentric circles with center o. A total order is defined on $\Omega$ by the distance at which the elements (circle) lie from the origin o. A color profile function F: $\Omega \rightarrow \mathbb{R}^3$ is defined as follows:

$$F([p]) := \sum_{p' \in [p]} C(p') \cdot \frac{1}{|[p]|} \quad (9)$$

In some examples, two points $p_0$, $p_1$ with $p_0 \sim p_1$ have the same color. Additionally, color profile is defined as an average color of the equivalence class. A smoothing filter is applied on the color profile to avoid irregularity.

For example, the colors between two color stops (say $s_l$, $s_r$) are a linear blend of the colors at the color stops ($s_l$, $s_r$). Hence, sharp changes in the slope of the color profile indicate the presence of a color stop. In an embodiment, color stop identification component 230 computes a Laplacian of the function of color intensity 1400. The transition point is identified based on the Laplacian (e.g., Laplacian diagram 1405). A Laplacian filter is applied on the color profile to identify the sharp changes because the value of the Laplacian at these points are peaks as shown in plotted graphs. The peaks are referred to as color stops (e.g., color stop 1415).

$$C(S)=\{F([p]):[p]\in S\} \qquad (10)$$

According to an embodiment, color stop identification component 230 identifies a set of candidate transition points. Color stop identification component 230 computes a measure of non-colinearity based on the set of candidate transition points (i.e., indicating the presence of candidate color stops 1410). Color stop identification component 230 filters the set of candidate transition points based on the measure of non-colinearity, where the transition point is selected based on the filtering. The selected transition point indicates a presence of color stop 1415 as shown on the third row of FIG. 14.

Figure 15:
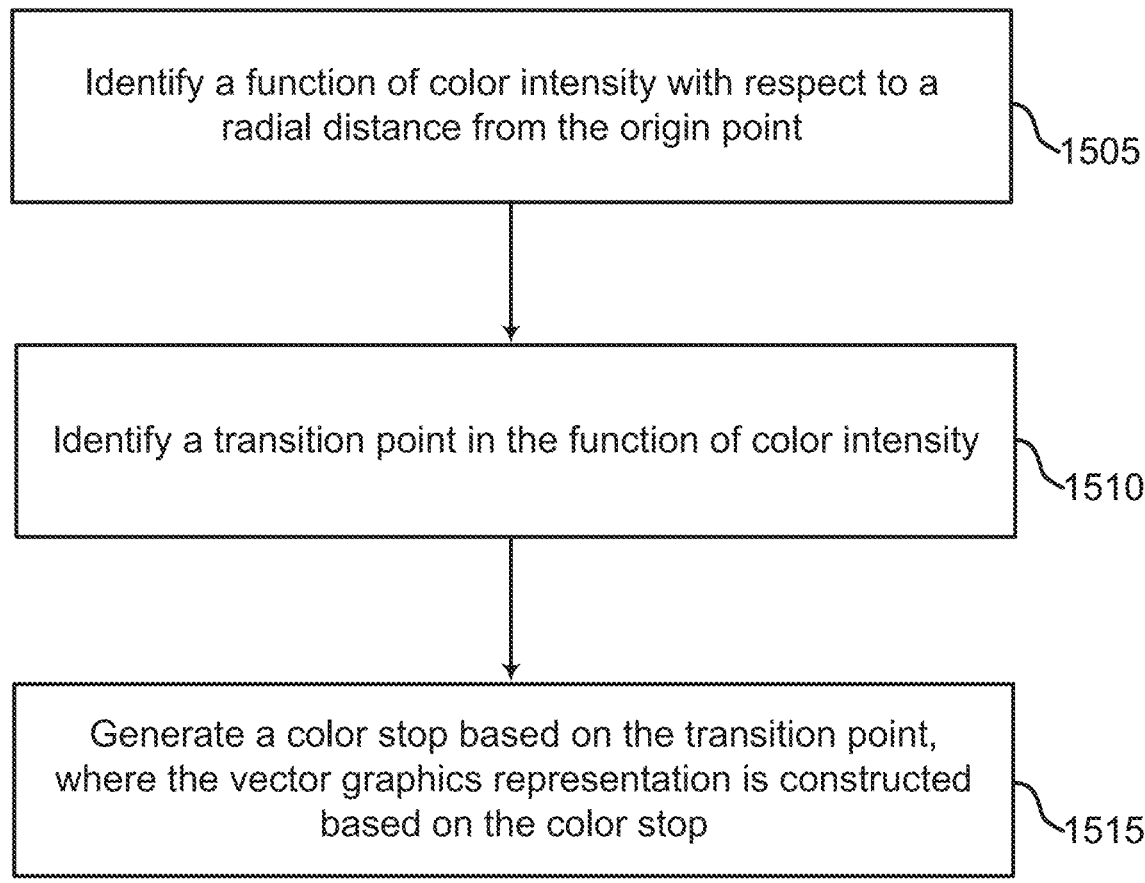
FIG. 15 shows an example of a method for generating a color stop according to aspects of the present disclosure.

FIG. 15 shows an example of a method for generating a color stop according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system identifies a function of color intensity with respect to a radial distance from the origin point. In some cases, the operations of this step refer to, or may be performed by, a color stop identification component as described with reference to FIGS. 2 and 3. A function of color intensity may also be referred to as color intensity function. For example, let $\Omega$ be the equivalence class. An equivalence class may form a circle with o as center or the origin point. The equivalence class $\Omega$ is a collection of concentric circles with center o. A total order is defined on $\Omega$ by the distance at which the elements (circle) lie from the origin o. A color profile function F: $\Omega \rightarrow \mathbb{R}^3$.

Color stop identification component is configured to estimate the color stops (and respective positions of the color stops) of the radial gradient with origin point o. If the image color is defined by radial gradient (with eccentricity 0), a pixel along any circle with o as center have the same color. Thus, a method to compute the color stops and the corresponding positions is defined.

At operation 1510, the system identifies a transition point in the function of color intensity. In some cases, the operations of this step refer to, or may be performed by, a color stop identification component as described with reference to FIGS. 2 and 3. For example, the transition point includes colors between two color stops (say $s_l$, $s_r$) that are a linear blend of the colors at the color stops ($s_l$, $s_r$).

According to an embodiment of the disclosure, the color stop identification component identifies multiple candidate transition points such that peak estimate may yield redundant stops. A clustering algorithm is used with rolling window (i.e., sliding) to classify candidate color stops that are close to one another as one color stop. For example, three color stops are co-linear if they lie on the same line in the color space. The degree of non-collinearity of three color stops is measured as follows:

$$\text{Non-Colinearity}(p_0, p_1, p_2) := \qquad (11)$$
$$\left| \|C(p_1) - C(p_0)\|^2 + \|C(p_1) - C(p_2)\|^2 - \|C(p_0) - C(p_2)\|^2 \right|$$

where the color C(p) is F ([p]). The color stop identification component computes a measure of non-colinearity based on the set of candidate transition points. The color stop identification component filters the candidate transition points to select a target transition point based on the non-colinearity measure.

At operation 1515, the system generates a color stop based on the transition point, where the vector graphics representation is constructed based on the color stop. In some cases, the operations of this step refer to, or may be performed by, a color stop identification component as described with reference to FIGS. 2 and 3. In some cases, color stops are eliminated for which the degree of non-colinearity is small, because the color variation at such a stop can be interpolated by its neighboring stops. After the distance of the stops from the origin point is computed, the gradient line (i.e., ramp) is placed in any direction starting from origin point o.

Figure 16:
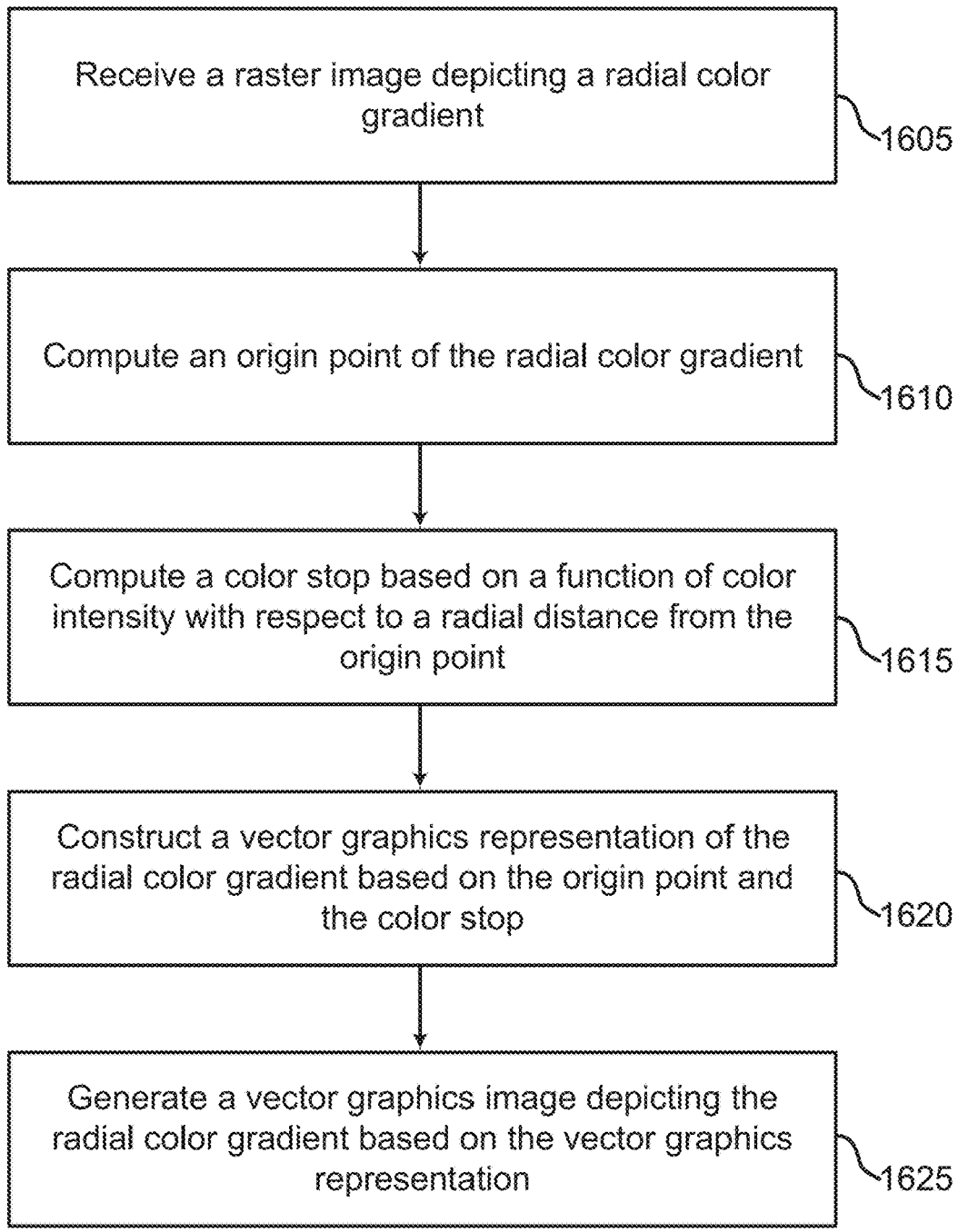
FIG. 16 shows an example of a method for generating a vector graphics image according to aspects of the present disclosure.

FIG. 16 shows an example of a method for generating a vector graphics image according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system receives a raster image depicting a radial color gradient. In some cases, the operations of this step refer to, or may be performed by, an image editing interface as described with reference to FIGS. 2, 3, and 7. The reconstruction of radial gradients is built on the assumption that an input image is approximated by radial gradients. Some example experiments validate this assumption by evaluating whether the pixel-wise difference (e.g., L2-norm) of the reconstructed radial gradient with respect to the input image is acceptable.

At operation 1610, the system computes an origin point of the radial color gradient. In some cases, the operations of this step refer to, or may be performed by, an origin estimation component as described with reference to FIGS. 2 and 3. According to an embodiment, the origin estimation component computes an origin point of the radial color gradient based on an orthogonality measure between a color gradient vector at a point in the raster image and a relative position vector between the point and the origin point. Detail with regards to computing an origin point of the radial color gradient is described in FIG. 9-13.

At operation 1615, the system computes a color stop based on a function of color intensity with respect to a radial distance from the origin point. In some cases, the operations of this step refer to, or may be performed by, a color stop identification component as described with reference to FIGS. 2 and 3.

According to an embodiment, color stop identification component 310 (see FIG. 3) is configured to estimate the color stops (and respective positions) of the radial gradient with origin point o. For an image color defined by radial gradient (with eccentricity 0), a pixel along any circle with o as center have the same color. The color intensity value on points along a circle with origin point o is averaged to obtain an average color intensity value which is used as the function of color intensity. Detail with regards to computing a color stop based on a color intensity function is described in FIG. 14-15.

At operation 1620, the system constructs a vector graphics representation of the radial color gradient based on the origin point and the color stop. In some cases, the operations of this step refer to, or may be performed by, a vector graphics representation component as described with reference to FIGS. 2 and 3.

At operation 1625, the system generates a vector graphics image depicting the radial color gradient based on the vector graphics representation. In some cases, the operations of this step refer to, or may be performed by, an image generation component as described with reference to FIGS. 2 and 3.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a raster image depicting a radial color gradient;
computing an origin point of the radial color gradient based on an orthogonality measure between a color gradient vector and a relative position vector, wherein the color gradient vector represents a color gradient at a point in the raster image, the relative position vector represents a difference between the point and the origin point, and the orthogonality measure indicates a degree of alignment between the color gradient vector and the relative position vector;
constructing a vector graphics representation of the radial color gradient based on the origin point; and
generating a vector graphics image depicting the radial color gradient based on the vector graphics representation.

2. The method of claim 1, further comprising:
computing a first color gradient corresponding to a first color channel of a plurality of color channels;
computing a second color gradient corresponding to a second color channel of the plurality of color channels; and
computing a third color gradient corresponding to a third color channel of the plurality of color channels, wherein the orthogonality measure is based on the first color gradient, the second color gradient, and the third color gradient.

3. The method of claim 1, further comprising:
generating a vector field of color gradient vectors at a plurality of points in the raster image;
computing a plurality of orthogonality measures corresponding to the plurality of points; and
computing a sum of the plurality of orthogonality measures, wherein the origin point is computed based on the sum.

4. The method of claim 3, further comprising:
computing a square of each of the plurality of orthogonality measures, wherein the sum is computed based on the square of each of the plurality of orthogonality measures.

5. The method of claim 1, further comprising:
identifying a function of the orthogonality measure with respect to a dependent variable corresponding to the origin point;
identifying a derivative of the function of the orthogonality measure;
identifying a system of equations by setting the derivative to zero; and
solving the system of equations to identify the origin point.

6. The method of claim 1, further comprising:
identifying a function of color intensity with respect to a radial distance from the origin point;
identifying a transition point in the function of color intensity; and
generating a color stop based on the transition point, wherein the vector graphics representation is constructed based on the color stop.

7. The method of claim 6, further comprising:
identifying a first color of the raster image at the origin point; and
identifying a second color of the raster image at a point corresponding to the color stop, wherein the vector graphics representation is constructed based on the first color and the second color.

8. The method of claim 6, further comprising:
identifying an additional transition point in the function of color intensity; and
generating an additional color stop based on the additional transition point, wherein the vector graphics representation is constructed based on the additional color stop.

9. The method of claim 6, further comprising:
identifying the radial distance from the origin point;
identifying a ring of points at the radial distance from the origin point;
identifying a color intensity value corresponding to each point of the ring of points; and
averaging the color intensity value across each point of the ring of points to obtain an average color intensity value, wherein the function of color intensity is based on the average color intensity value.

10. The method of claim 6, further comprising:
computing a Laplacian of the function of color intensity, wherein the transition point is identified based on the Laplacian.

11. The method of claim 6, further comprising:
identifying a plurality of candidate transition points;
computing a measure of non-colinearity based on the plurality of candidate transition points; and
filtering the plurality of candidate transition points based on the measure of non-colinearity, wherein the transition point is selected based on the filtering.

12. The method of claim 1, further comprising:
receiving the raster image from a user; and
receiving a command from the user to convert the raster image to the vector graphics image, wherein the vector graphics image is generated based on the command.

13. The method of claim 1, further comprising:
normalizing the orthogonality measure, wherein the origin point of the radial color gradient is computed based on the normalized orthogonality measure.

14. A method comprising:
receiving a raster image depicting a radial color gradient;
computing an origin point of the radial color gradient;
identifying a function of color intensity with respect to a radial distance from the origin point;
identifying a plurality of candidate transition points;
computing a measure of non-colinearity based on the plurality of candidate transition points;
filtering the plurality of candidate transition points based on the measure of non-colinearity;
identifying a transition point in the function of color intensity based on the filtering;
generating a color stop based on the transition point;
constructing a vector graphics representation of the radial color gradient based on the origin point and the color stop; and
generating a vector graphics image depicting the radial color gradient based on the vector graphics representation.

15. The method of claim 14, further comprising:
computing the origin point of the radial color gradient based on an orthogonality measure between a color gradient vector at a point in the raster image and a relative position vector between the point and the origin point.

16. The method of claim 14, further comprising:
identifying a first color of the raster image at the origin point; and
identifying a second color of the raster image at a point corresponding to the color stop, wherein the vector graphics representation is constructed based on the first color and the second color.

17. The method of claim 14, further comprising:
identifying an additional transition point in the function of color intensity; and
generating an additional color stop based on the additional transition point, wherein the vector graphics representation is constructed based on the additional color stop.

18. An apparatus comprising:
at least one processor; and
at least one memory including instructions that, when executed by the at least one processor, cause the at least one processor to perform operations comprising:
computing an origin point of a radial color gradient based on an orthogonality measure between a color gradient vector and a relative position vector, wherein the color gradient vector represents a color gradient at a point in a raster image, the relative position vector represents a difference between the point and the origin point, and the orthogonality measure indicates a degree of alignment between the color gradient vector and the relative position vector;
computing a color stop based on a function of color intensity with respect to a radial distance from the origin point;
constructing a vector graphics representation of the radial color gradient based on the origin point and the color stop; and
generating a vector graphics image depicting the radial color gradient based on the vector graphics representation.

19. The apparatus of claim 18, wherein the at least one processor is further configured to perform operations comprising:
receiving the raster image depicting the radial color gradient.

* * * * *